(12) United States Patent
Ranous et al.

(10) Patent No.: US 8,463,617 B2
(45) Date of Patent: Jun. 11, 2013

(54) NETWORK SUBSCRIBER USAGE RECORDING SYSTEM

(75) Inventors: Alexander Charles Ranous, Redwood City, CA (US); Michael James Baumann, Fort Collins, CO (US); Glenna G. Mayo, San Jose, CA (US); Jeffrey David Meyer, Sunnyvale, CA (US); Joan Simon Raventos, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 2591 days.

(21) Appl. No.: 10/453,068

(22) Filed: Jun. 3, 2003

(65) Prior Publication Data

US 2004/0039809 A1    Feb. 26, 2004

Related U.S. Application Data

(60) Provisional application No. 60/385,756, filed on Jun. 3, 2002.

(51) Int. Cl.
| | |
|---|---|
| G06Q 10/00 | (2012.01) |
| G06F 15/173 | (2006.01) |
| G06F 9/00 | (2006.01) |
| G06F 9/24 | (2006.01) |
| G06F 15/177 | (2006.01) |

(52) U.S. Cl.
USPC .................. 705/1.1; 709/224; 713/1

(58) Field of Classification Search
None
See application file for complete search history.

(56) References Cited

U.S. PATENT DOCUMENTS

| | | | |
|---|---|---|---|
| 3,512,159 A | 5/1970 | Clark et al. | |
| 3,611,423 A | 10/1971 | Rutsche | |
| 4,361,877 A | 11/1982 | Dyer et al. | |
| 4,516,138 A | 5/1985 | Iwasawa et al. | |
| 4,819,162 A | 4/1989 | Webb, Jr. et al. | |
| 4,827,508 A | 5/1989 | Shear | |
| 5,155,680 A | 10/1992 | Wiedemer | |
| 5,255,183 A | 10/1993 | Katz | |
| 5,305,238 A | 4/1994 | Starr, III et al. | |
| 5,321,838 A | 6/1994 | Hensley et al. | |
| 5,448,729 A | 9/1995 | Murdock | |
| 5,638,508 A * | 6/1997 | Kanai et al. ..................... | 714/20 |
| 5,696,702 A | 12/1997 | Skinner et al. | |

(Continued)

FOREIGN PATENT DOCUMENTS

| | | |
|---|---|---|
| EP | 1039694 A2 | 10/2003 |
| WO | WO03/094000 | 11/2003 |

OTHER PUBLICATIONS

Chaney, S., "If You Bill Clients by the Hour, TRACKR Can Simplify Your Life," PC Magazine, vII, N1, Jan. 14, 1992, p. 387 (3).

(Continued)

*Primary Examiner* — Asfand Sheikh

(57) ABSTRACT

Embodiments of the present invention provide a network subscriber usage recording system and method with configurable audit system. In one embodiment, a network subscriber usage recording system comprises an encapsulator for reading a plurality of network subscriber metadata records from a network data source and converting the network data records to a plurality of data normalized metered events. An aggregator is provided for processing the data normalized metered events to create aggregated normalized metered events. An auditor is provided for generating audit normalized metered events based on the data normalized metered events.

32 Claims, 10 Drawing Sheets

U.S. PATENT DOCUMENTS

| | | | |
|---|---|---|---|
| 5,963,914 A | 10/1999 | Skinner et al. | |
| 6,032,132 A | 2/2000 | Nelson | |
| 6,405,251 B1 * | 6/2002 | Bullard et al. | 709/224 |
| 6,446,200 B1 | 9/2002 | Ball et al. | |
| 6,813,645 B1 * | 11/2004 | Meyer | 709/245 |
| 7,024,468 B1 * | 4/2006 | Meyer et al. | 709/220 |
| 7,124,180 B1 * | 10/2006 | Ranous | 709/224 |
| 7,206,791 B2 * | 4/2007 | Hind et al. | 707/104.1 |
| 7,293,083 B1 * | 11/2007 | Ranous et al. | 709/224 |
| 2003/0005145 A1 * | 1/2003 | Bullard | 709/238 |

OTHER PUBLICATIONS

Examination Report Under Section 18 (3) received in GB Application No, 0412270.1, mailed Mar. 27, 2006, pp. 2.

Examination Report Under Section 18 (3) received in GB Application No. 0412270.1, mailed Oct. 18, 2006, pp. 4.

* cited by examiner

NETWORK SUBSCRIBER USAGE RECORDING SYSTEM

CROSS-REFERENCE TO RELATED APPLICATIONS

This Non-Provisional patent application claims the benefit of the filing date of U.S. Provisional Application Ser. No. 60/385,756 filed Jun. 3, 2002, entitled "Network Usage Data Recording System and Method Including an Audit System."

BACKGROUND OF THE INVENTION

Network systems are utilized as communication links for everyday personal and business purposes. With the growth of network systems, particularly the Internet, and the advancement of computer hardware and software technology, network use ranges from simple communication exchanges such as electronic mail to more complex and data intensive communication sessions such as web browsing, electronic commerce, and numerous other electronic network services such as Internet voice, and Internet video-on-demand.

Several important technological changes are key drivers in creating increasing demand for timely and cost-effective collection of Internet usage information. One technological change is the dramatically increasing Internet access bandwidth at moderate subscriber cost. Most consumers today have only limited access bandwidth to the Internet via an analog telephony modem, which has a practical data transfer rate upper limit of about 56 thousand bits per second. When a network service provider's subscribers are limited to these slow rates, there is a limit to the subscriber's ability to overload the service provider's network. However, the increasing wide scale deployments of broadband Internet access through digital cable modems, digital subscriber line, microwave, and satellite services are increasing the Internet access bandwidth by several orders of magnitude. As such, this higher access bandwidth significantly increases the potential for network congestion and bandwidth abuse by heavy users. With this much higher bandwidth available, the usage difference between a heavy user and light user can be quite large. This difference can make a fixed-price, all-you-can-use pricing plan difficult to sustain. If the service provider charges too much for the service, the light users will be subsidizing the heavy users; if the service provider charges too little, the heavy users will abuse the available network bandwidth, which will be costly for the service provider.

Additionally, there has been a shift to real-time delivery requirements. Along with this shift, there has been an accompanying need to measure quality of service delivered. For example, the network provider might track or verify that all information during a download session is delivered to the subscriber and not just part of the requested information.

Another technological change is the rapid growth of applications and services that require high bandwidth. Examples include Internet telecommunications, video-on-demand, and complex multiplayer multimedia games. These types of services increase the duration of time that a user is connected to the network as well as increase the bandwidth required to supply the service.

Another technological change is the transition of the Internet from "best effort" to "mission critical." As many businesses are moving to the Internet, they are increasingly relying on this medium for their daily success. This transitions the Internet from a casual, best-effort delivery service into a mainstream and critical part of commerce.

Due to the above driving forces, among others, Internet service providers are moving from current, fixed-rate, all-you-can-use Internet access billing plans to more complex billing plans, these plans charge by metrics, such as volume of data transferred, bandwidth utilized, service used, time-of-day, and subscriber class, which defines a similar group of subscribers by their usage profile, organizational affiliation, or other attributes. An example of such a rate structure might include a fixed monthly rate portion, a usage allocation to be included as part of the fixed monthly rate (a threshold), plus a variable rate portion for usage beyond the allocation (or threshold). For a given service provider there will be many such rate structures for the many possible combinations of services and subscriber classes.

Network usage data recording systems are utilized for collecting, correlating, and aggregating network usage information as it occurs (in real time or near real time). These systems are also utilized for creating IDRs as output that can be consumed by computer business systems that support the above business functions. It may be necessary to correlate different types of network usage data obtained from independent network data sources to obtain information required by certain usage applications.

For billing applications, network usage data is correlated with network session information. Network usage data for a given usage event typically includes a source Internet protocol (IP) address, a destination IP address interconnect data, byte count or packet counts (i.e., amount of data transferred across a given connection) and a time stamp. Network usage data does not identify the user or billing party that actually performed the action or usage event. Network session information typically includes a source IP address, a time stamp (e.g., start time and end time) and a user name or account name. A usage application for billing purposes requires user names and byte counts. As such, network usage data must be correlated with network session information in order to create a usage record having an association between a billable account and the usage event.

Many service providers have the ability to offer consolidated voice and data products with bundled discounts and one-rate packages combining different services. To pull these services together, however, service providers must combine components from several different partners, suppliers (switch venders, gateway venders, billing venders, etc.) and the their own internal systems. Integrating distributed, product-oriented systems with new customer-oriented systems has been a challenging problem. One known solution is a usage mediation and management platform commercially available under the tradename Internet Usage Manager from Hewlett-Packard Company. The Internet Usage Manager mediation and management platforms supports pre-paid and post-paid billing models for wire-line and wireless networks carrying voice and data services. Other usage data recording systems are disclosed in U.S. patent application Ser. Nos. 09/559,438; 09/559,693; 09/560,032; and 09/578,826, all of which are commonly assigned to Hewlett-Packard Company. These usage data recording systems provide a scalable, distributed architecture to collect, aggregate and correlate usage data from service infrastructure and provide results to business support systems for billing and strategic market analysis.

With the complexity of usage-based billing due to the various data sources and data types, the problem of revenue leakage also exists. Although exact figures of revenue loss are rarely public data, estimates of 5-15 percent losses of total revenue are not uncommon. The reduction or elimination of revenue leakage would help ensure that subscribers are billed completely and accurately.

SUMMARY OF THE INVENTION

Embodiments of the present invention provide a network subscriber usage data recording system and method having an audit system. In one embodiment, a network subscriber usage recording system comprises an encapsulator for reading a plurality of network subscriber metadata records from a network data source and converting the network data records to a plurality of data normalized metered events. An aggregator is provided for processing the data normalized metered events to create aggregated normalized metered events. An auditor is provided for generating audit normalized metered events based on the data normalized metered events.

DETAILED DESCRIPTION

In the following detailed description of the preferred embodiments, reference is made to the accompanying drawings that form a part hereof and show, by way of illustration, exemplary embodiments in which the invention may be practiced.

Although the term network is specifically used throughout this application, the term network is defined to include the Internet and other network systems, including public and private networks that may or may not use the TCP/IP protocol suite for data transport. Examples include the Internet, Intranets, extranets, telephony networks, voice and data wire-line and wireless networks, and other wire-line and wireless networks. Although the term Internet is specifically used throughout this application, the term Internet is an example of a network and is used interchangeably within the term network. The terms network data, network usage data and network accounting data are used to include various types of information associated with networks, such as network usage data, network session data and network systems event data. The term "normalized metered event" as used herein refers to a standard or universal data format that allows data to be useable by multiple system components.

Network usage information does not include the actual information exchanged in a communications session between parties, but rather includes metadata (data about data) information about the communication sessions and consists of numerous usage detail records (UDRs). The types of metadata included in each UDR will vary by the type of service and network involved, but will often contain detailed pertinent information about a particular event or communications session between parties such as the session start time and stop time, source or originator of the session, destination of the session, responsible party for accounting purposes, type of data transferred, amount of data transferred, quality of service delivered, etc. In telephony networks, the UDRs that make up the usage information are referred to as call detail records or CDRs. In other aspects, the term event data records (EDR) is used to describe network records, which may include usage detail records. In Internet networks, usage detail records do not yet have a standardized name, but in this application they will be referred to as Internet detail records or IDRs. Although the term IDR is specifically used throughout this application in connection with an Internet example context, the term IDR is defined to represent a UDR or EDR of any network.

Network usage information is useful for many important business functions such as subscriber billing, marketing & customer care, and operations management. Examples of these computer business systems include billing systems, marketing and customer relationship management systems, customer chum analysis systems, data mining systems, revenue assurance systems, fraud detection, network management, and capacity planning.

Figure 1:
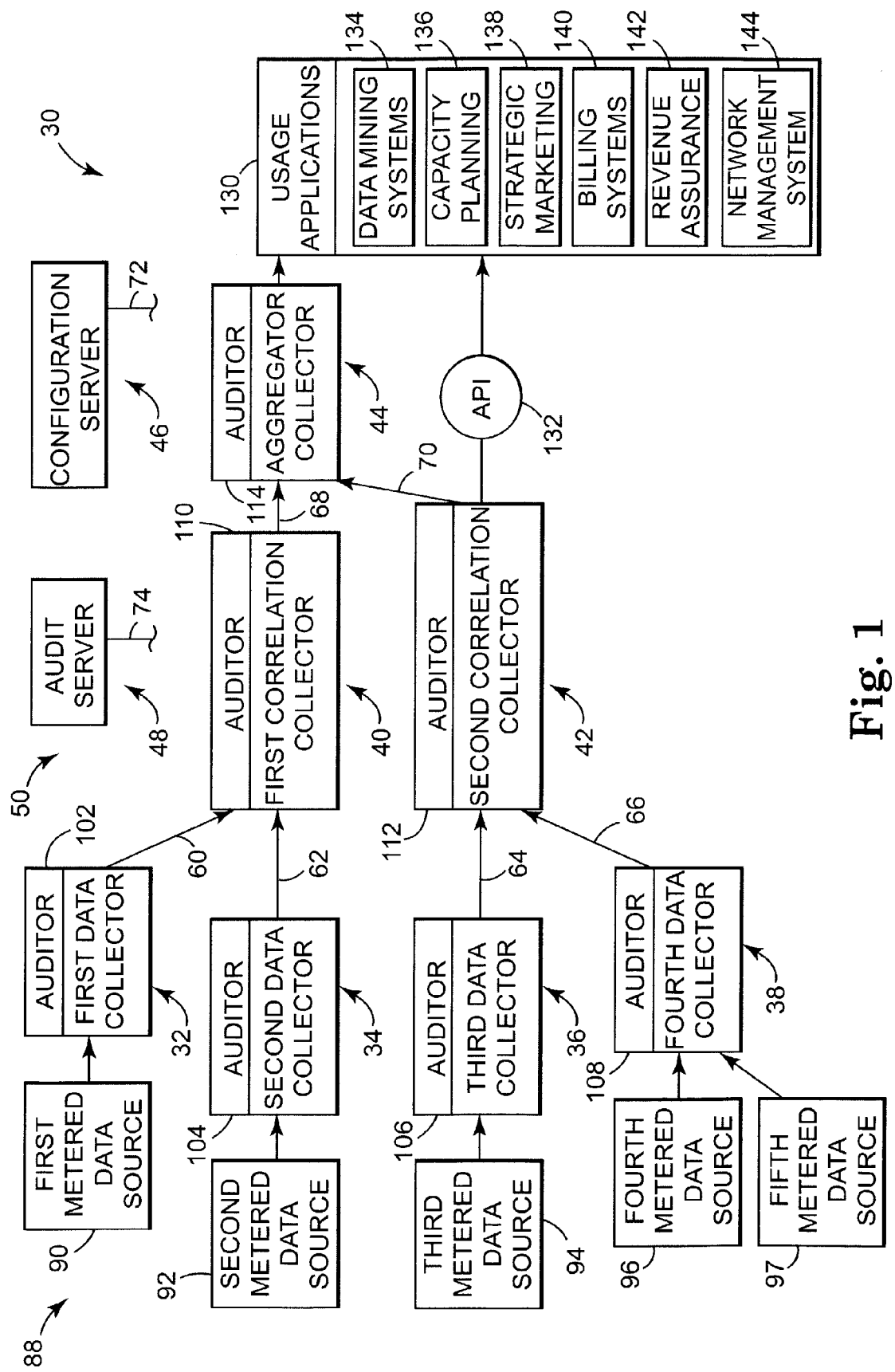
FIG. 1 is a block diagram illustrating one exemplary embodiment of a network usage data recording system having an auditing system, according to the present invention.

In FIG. 1, an embodiment of a network usage data recording system having an auditing system according to the present invention is illustrated generally at 30. Network usage data recording system 30 and other embodiments of the network usage data recording system according to the present invention include several main components, each of which is a software program. The main software program components of the network usage data recording system run on one or more computer or server systems. Alternatively, components of the present invention can be implemented in embedded network device firmware, or a combination of software and hardware.

In one embodiment, each of the main software program components runs on its own computer system. In other embodiments, the main software program components run concurrently on the same computer system. In one exemplary embodiment, at least a portion of each software program is written in Java programming language, and each of the main components communicate with each other using a communication bus protocol, that is common object request broker architecture (CORBA) based. Other programming languages and communication bus protocols suitable for use with the present invention will become apparent to one skilled in the art after reading the present application.

Network usage data recording system 30 provides a system and method for recording usage data from independent data sources and includes an auditing system for auditing the recorded usage data, providing assurance that the usage data is accurately collected, recorded and reported.

Network usage data recording system 30 includes a first data collector 32, a second data collector 34, a third data collector 36, a fourth data collector 38, a first correlation collector 40, a second correlation collector 42, an aggregator collector 44, a configuration server 46 and an audit server 48 which is part of an audit system 50.

The network usage data recording system 30 provides for a hierarchy or multiple levels of network data processing and auditing, with the storage of usage metadata and audit metadata at each level. First data collector 32 is coupled to first correlation collector 40 via communication link 60. Second data collector 34 is coupled to first correlation collector 40 via communication link 62. Third data collector 36 is coupled to second correlation collector 42 via communication link 64. Fourth data collector 38 is coupled to second correlation collector 42 via communication link 66. First correlation collector 40 is coupled to aggregator collector 44 via communication link 68. Second correlation collector 42 is coupled to aggregator collector 44 via communication link 70. Similarly, configuration server 72 is coupled to collectors 32, 34, 36, 38, 40, 42, 44 via communication link 72; and audit server 48 is coupled to collectors 32, 34, 36, 38, 40, 42, 44 via communication link 74. In one embodiment, collectors 32, 34, 36, 38, 40, 42, 44, configuration server 46 and audit server 48 communicate via a standard bus communication protocol. In one exemplary embodiment, the standard bus protocol is a CORBA-based bus protocol.

Other suitable exemplary protocols include Simple Object Access Protocol (SOAP), JMS or Distributed Computing Environment (DCE). Other suitable bus protocols for use with the present invention are also possible and will be apparent to one skilled in the art after reading this application.

It is desirable to help monitor data processing system status and system integrity, maintain data integrity, avoid loss of data, and provide business intelligence for product planning. It is further desirable to repair and correct corrupt usage data and process the corrected data in order to retrieve billable events from otherwise unusable records. Embodiments of the present invention provide an audit process to assure data integrity and the ability to retrieve billable events from otherwise unusable records.

Network usage data recording system 30 includes auditing system 50 that operates to collect, process and report auditing metadata (i.e., data about usage metadata). The system also assures that usage data is accurately collected, recorded and reported. The auditing system 50 includes an error recovery process to repair and correct corrupt usage data in order to retrieve billable events from otherwise unusable records.

In one embodiment, auditing system 50 includes audit server 48 and an auditor located at each "point" or location within the system. Audit server 48 is in communication with each auditor. In one exemplary embodiment, an auditor is associated with each data collector. In one aspect, the auditor is integrated with the data collector. In the embodiment illustrated, auditor 102 is associated with first data collector 32; auditor 104 is associated with second data collector 34; auditor 106 is associated with third data collector 36; auditor 108 is associated with fourth data collector 38; auditor 110 is associated with first correlation collector 40; auditor 112 is associated with second correlation collector 42; and auditor 114 is associated with aggregator collector 44.

Network usage data recording system 30 receives raw data from network data sources 88, including first metered data source 90, second metered data source 92, third metered data source 94 and fourth metered data source 96 and fifth metered data source 97. The network data sources 88 are positioned at various points on the network to receive raw network usage data (i.e., data in its native format). In other applications, the network data sources 88 include network application level sources (e.g., web server logs or e-mail logs). In one example, first data collector 32 queries first metered data source 90 for raw usage data. First data collector 32 receives the raw usage data and converts the raw usage data to a standard format. In one preferred embodiment, first data collector 32 converts the raw usage data to normalized metered events (NMEs). First data collector 32 may also perform other processing operations on the usage data, such as data reduction, and store the usage data in the form of NMEs. Similarly, second data collector 34 queries second metered data source 92 for raw usage data. The second data collector 34 receives the raw usage data from second metered data source 92 and converts the raw usage data from its native format to an NME format. Second data collector 34 may also process the usage data, such as performing data reduction on the usage data. The usage data is stored at the second data collector 34. In a similar manner, third data collector 36 queries third metered data source 94 for raw usage data, and fourth data collector 38 queries fourth metered data source 96 for raw usage data. The third data collector 36 and fourth data collector 38 receive the raw usage data, convert the usage data to NMEs, process and store the usage data.

The network usage information collected from each metered data source does not include the actual information exchanged in a communication session between parties (i.e., actual information is transferred but not retained). Instead, the network usage information includes usage metadata (data about data) information about the communication session, such as session start time and stop time, source or originator of the session, destination of the session, responsible party for accounting purposes, type of data transferred, amount of data transferred, quality of service delivered, etc.

In a similar manner, the auditor located at each data collector collects audit metadata which corresponds to the usage metadata. As such, the audit metadata (e.g., in the form of NMEs) is used to verify the accuracy of the collected usage data. The audit metadata is similarly stored at each data collector.

First correlation collector 40 queries the first data collector 32 for a first set of usage data NMEs via communication link 60. First correlation collector 40 queries second data collector 34 for a second set of usage data NMEs via communication link 62. The first correlation collector 40 correlates the first set of NMEs with the second set of NMEs to define a set of correlated NME data and stores the correlated NME data at first correlation collector 40. In one embodiment, first correlation collector 40 provides for batch correlation of the network data collected via first data collector 32 and second data collector 34. As such, the data does not have to be correlated in real time or near real time (i.e., as the data is collected).

The data correlator collector 40 queries the first data collector 32 and the second data collector 34 for network data at a desired time, wherein the queried network data is associated with a desired time interval. The data correlator collector 40 may include a preset query interval which may be set to a predefined time interval (e.g., every 15 minutes). Since the data is not required to be correlated in real time or near real time, the first data collector 32 and second data collector 34 continue to collect, process and store data independent of the correlation process of data correlator collector 40. Batch correlation by data correlator collector 40 does not require additional processes necessary to handle a real time flow of data from first data collector 32 and second data collector 34 such as a queuing process. First data collector 32 has the ability to perform processing of network data including data reduction before the data is received by data correlator 40. Similarly, second data collector 34 can perform processing of network data including data reduction before the data is received by data correlator, collector 40. Data correlator collector 40 stores the correlated data output. In a similar manner, data is collected by second correlation collector 42 from third data collector 36 and fourth data collector 38. Auditor 110 and auditor 112 perform audit functions on the collected and correlated usage data at each correlation collector, first correlation collector 40 and second correlation collector 42.

In one embodiment, aggregator collector 44 queries first correlation collector 40 for correlated usage data and second correlation collector 42 for correlated usage data. The aggregator collector 44 receives and processes the correlated usage data (e.g., aggregates) and converts the aggregated data to a data format usable by usage applications 130. In another aspect, Application Program Interface (API) 132 queries second correlation collector 42 for correlated data output, and converts the correlated data to a data format usable by a usage application 130. Typical usage applications 130 may include data mining systems 134, capacity planning systems 136, strategic marketing systems 138, billing systems 140, revenue assurance systems 142 and network management systems 144. Data collectors can have inputs from multiple data sources. In one embodiment illustrated, fourth data collector 38 receives data from fourth metered data source 96 and fifth metered data source 97.

Figure 2:
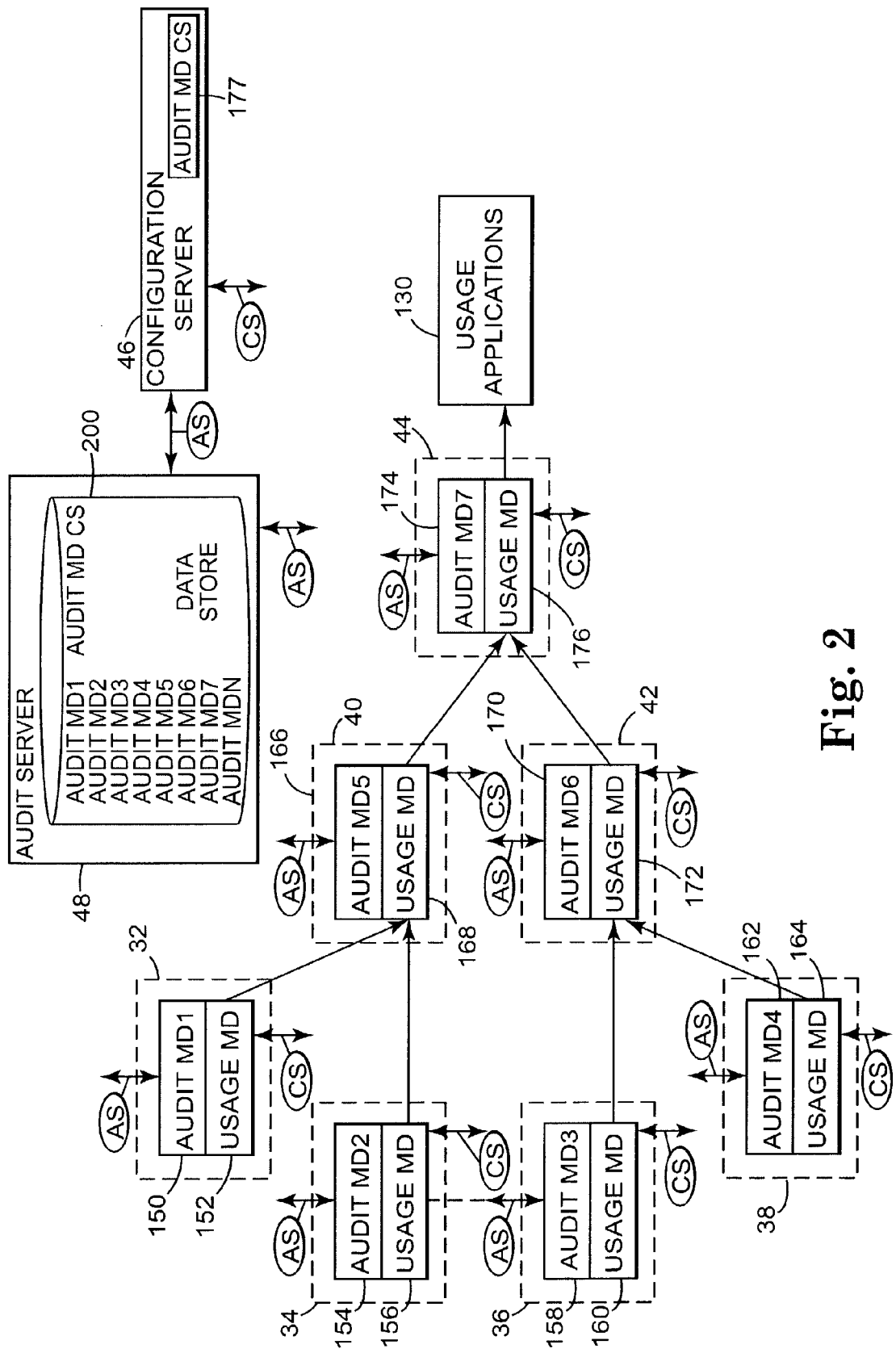
FIG. 2 is a block diagram illustrating one exemplary embodiment of usage metadata and audit metadata within a network usage data recording system according to the present invention.

FIG. 2 is a block diagram illustrating one exemplary embodiment of usage metadata and audit metadata within the network usage data recording system 30 (FIG. 1). For clarity, individual collectors are illustrated by dashed lines forming boxes; audit metadata is illustrated by AUDIT MD; and usage metadata is illustrated by USAGE MD. Audit metadata collection mirrors usage metadata collection providing audit metadata for usage metadata accuracy checking and problem resolution. In one exemplary embodiment illustrated, audit metadata 150 and usage metadata 152 are collected and stored at first data collector 32; audit metadata 154 and usage metadata 156 are collected and stored at second data collector 34; audit metadata 158 and usage metadata 160 are collected and stored at third data collector 36; audit metadata 162 and usage metadata 64 are collected and stored at fourth data collector 38; audit metadata 166 and usage metadata 168 are collected and stored at first correlation collector 40; audit metadata 170 and usage metadata 172 is collected and stored at second correlation collector 42; and audit metadata 174 and usage metadata 176 are collected and stored at aggregator collector 44.

Audit server 48 queries first data collector 32, second data collector 34, third data collector 36, fourth data collector 38, first correlation collector 40, second correlation collector 42 and aggregator collector 44 to receive the corresponding collected audit metadata 150, 154, 156, 158, 162, 166, 170, 174. The audit server 48 includes a data store 200 for storing (e.g., archiving) the collected audit metadata 150, 154, 156, 158, 162, 166, 170, 174. Additionally, audit metadata can be collected for other applications, such as audit metadata associated with configuration server 46, indicated as audit metadata 177. This audit metadata can be different than usage data collector audit metadata. In one aspect, the configuration server audit metadata 177 includes audit metadata associated with configuration changes and versioning configurations. In turn, the audit server 48 provides processing and analysis of the collected audit metadata and corresponding audit report generation. In a similar manner, configuration server 46 queries each data collector for the data collector's corresponding usage metadata 152, 156, 160, 164, 168, 172, 176.

Figure 3:
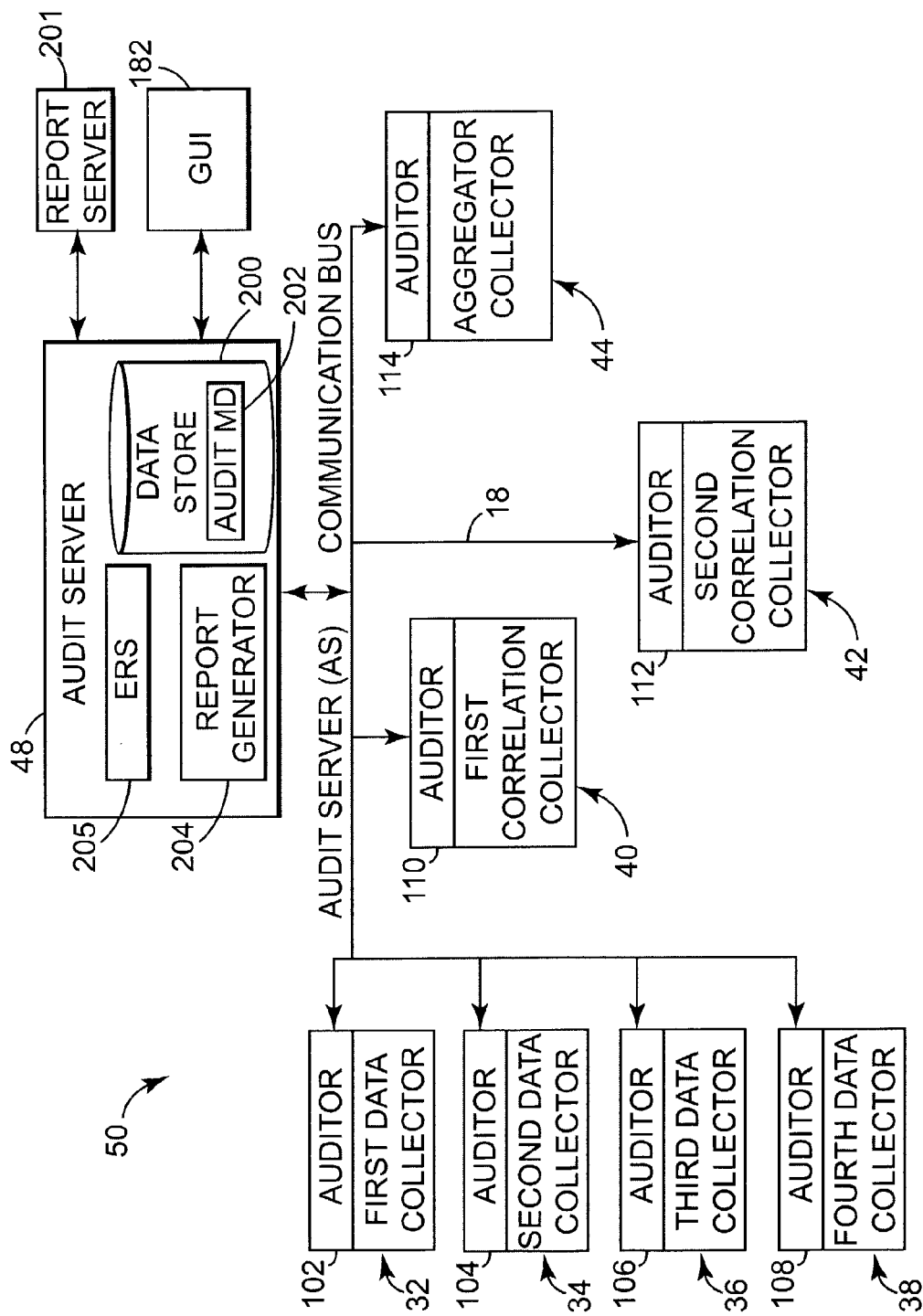
FIG. 3 is a block diagram illustrating one exemplary embodiment of an audit system for use with a network usage recording system according to the present invention.

FIG. 3 is a block diagram illustrating one exemplary embodiment of auditing system 50 according to the present invention. The auditing system 50 includes audit server 48 and auditor 102, auditor 104, auditor 106, auditor 108, auditor 110, auditor 112 and auditor 114 located at each data collector. Auditing system 50 also includes a user interface 182. In one embodiment, user interface 182 is a graphical user interface (GUI). In one aspect, the graphical user interface is a windows based graphical user interface. The user interface 182 is operable to configure audit server 48 and to receive and display audit reports generated from audit server 48. In one aspect, user interface 182 is operable to communicate via audit server 48 and communication bus 18 with each data collector for configuration and set-up of each auditor associated with each data collector.

In another aspect, a graphical user interface is operable to communicate with each data collector for configuration and set up of each data collector including each auditor associated with each data collector. Report server 201 is provided in communication with audit server 48 to generate standard and custom audit reports.

In one embodiment, the configuration for each auditor is stored at auditor server 48. At start-up (e.g., power-up) each auditor queries the audit server 48 for its audit configuration. Each auditor operates to collect audit metadata corresponding to the usage metadata at each collector. Some processing of the audit metadata is performed at each collector.

Audit server 48 queries each auditor at each collector for audit metadata. In one aspect, audit server 48 dynamically queries the configuration to see which collectors have audit enabled. If a collector has audit enabled, audit server 48 pulls the collector's audit metadata. The collected audit metadata can be aged once it is transferred to the audit server. The audit server can be configured to age the audit metadata separate from the usage metadata. Audit server 48 queries auditor 102, auditor 104, auditor 106, auditor 108, auditor 110, auditor 112, and auditor 114 for audit metadata, and stores the audit metadata at data store 200, indicated at 202. The audit server 48 processes and performs audit functions on the stored audit metadata 202. For example, audit server 48 is operable to compare the audit metadata corresponding to the sets of usage data output from first data collector 32 and second data collector 34, with the audit metadata corresponding to usage data received by first correlation collector 40. Any "errors" or usage data leaks are logged. Further, audit server 48 includes an error recovery system 205 for the error correction and processing of otherwise lost data records. In one aspect, an audit exception NME is created corresponding to a data record having an "error." Each audit exception NME is stored in the corresponding database and is available to be queried by the error recovery system 205. The audit exception NMEs are available for reporting and in one embodiment are reported via report generator 204 and report server 201. Error recovery system 205 can be part of the audit server 48 or can be separate, and in one embodiment the system consists of one or more separately configured collectors. Audit server 48 includes report generator 204 for generating audit reports based on the processed audit metadata 202. The generated reports can be output to graphical user interface 182 or stored in data store 200.

Figure 4:
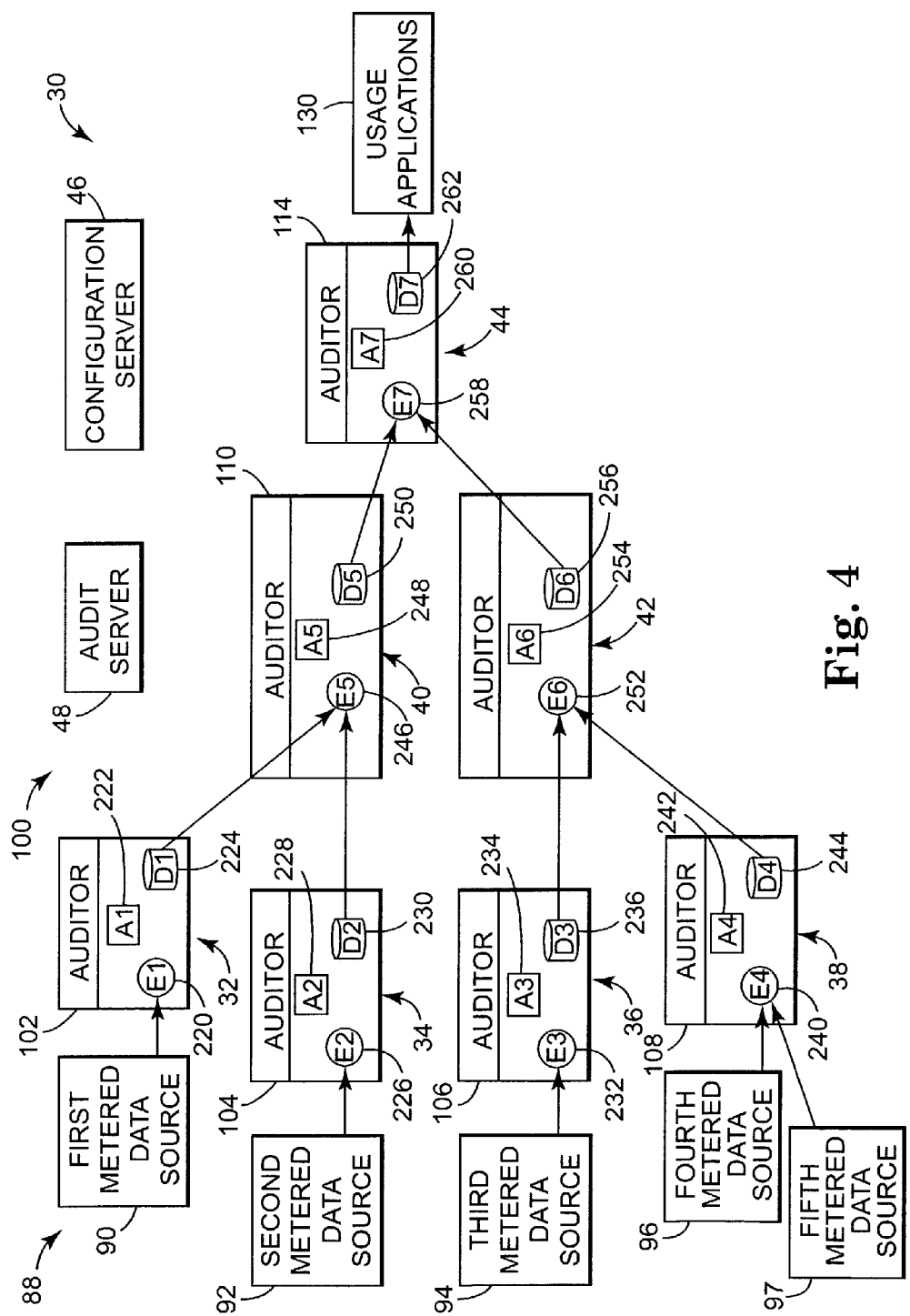
FIG. 4 is a block diagram illustrating another exemplary embodiment of a multiple level network usage data recording system according to the present invention.

FIG. 4 is a diagram illustrating one exemplary embodiment of a network usage data recording system according to the present invention. In one embodiment illustrated, the network usage data recording and auditing system 30 is a flexible, configurable system. The collectors are all formed from the same modular components, which include an encapsulator, an aggregator, and a data storage system. Each component that makes up each of these collectors is individually configurable. The configuration information for each of these collectors is stored at a centralized location at the configuration server 46 and managed by the configuration server 46. Similarly, the configuration for each auditor is set up and stored at a centralized location at audit server 48 and managed by audit server 48. At startup, the collectors query the configuration server 46 to retrieve their corresponding usage data collection configuration, and query audit server 48 to receive their corresponding auditor configuration. Other applications that interact with the collectors also query the configuration server to locate the collectors.

Each collector illustrated is represented by its three main components, an encapsulator (E), an aggregator (A), and a data storage system (D). In particular, first data collector 32 includes first encapsulator 220 (E1), first aggregator 222 (A1) and first data storage system 224 (D1); second data collector 34 includes second encapsulator 226 (E2), second aggregator 228 (A2) and second data storage system 230 (D2); third data collector 36 includes third encapsulator 232 (E3), third aggregator 234 (A3) and third data storage system 236 (D3); fourth data collector 38 includes fourth encapsulator 240 (E4), fourth aggregator 242 (A4) and fourth data storage system 244 (D4); first correlation collector 40 includes fifth encapsulator 246 (E5), fifth aggregator 248 (A5) and fifth data storage system 250 (D5); second correlation collector 42 includes sixth encapsulator 252 (E6), sixth aggregator 254 (A6) and sixth data storage system 256 (D6); and aggregator collector 44 includes seventh encapsulator 258 (E7), seventh aggregator 260 (A7) and seventh data storage system 262 (D7).

In other embodiments, multiple aggregator outputs from one or more collectors can be output to one or more (i.e., multiple) data stores. Each output can be audited. Further, collector outputs can be provided to multiple usage applications. The collector outputs (i.e., data transferred) to the usage applications is also auditable. In one aspect, an audit NME is configured to record NMEs transferred to each usage application.

Figure 5:
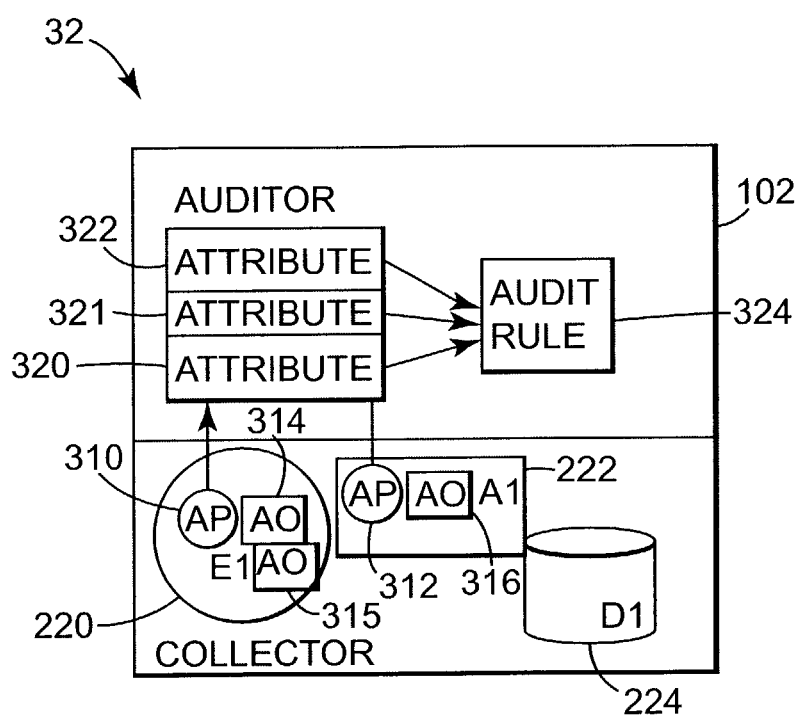
FIG. 5 is a block diagram illustrating one exemplary embodiment of a collector having an auditor, for use with a network usage data recording system according to the present invention.

FIG. 5 is a block diagram illustrating one exemplary embodiment of an auditor corresponding to each collector (e.g., collectors 32, 34, 36, 38, 40, 42, 44) illustrated in network usage data recording and auditing system 30. Each auditor collects key audit metrics about usage data flowing into, through and out of a collector. These audit metrics are used by the audit server for tracking the flow of usage data through a given deployment, from network elements through the usage data mediation platform and onto usage applications. Each auditor includes an audit data collection process that is defined by the following entities: an audit attribute (ATTRIBUTE), an audit point (AP), an audit operation (AO), audit rule and audit NMEs. An audit attribute is a usage processing metric. An audit point is a point in a collector where audit attributes can be collected using audit operations. An audit point has zero or more (e.g., two) audit operations associated with it. An audit operation is an operation to be performed at an audit point for an attribute (e.g., add). An audit rule is a usage system rule that checks audit attributes to verify usage data processing correctness. An audit rule operation is located at the auditor and/or audit server. Audit NMEs is the formatting of audit information in NME attributes usable by the audit server.

Embodiments of the auditing system according to the present invention enable predetermined, standard audit components and custom, configurable audit components. Customizable aspects of audit components include custom audit attributes, custom audit operations, and custom audit verification or rules that may exist either in a collector or at the audit server. The term "custom" is defined as an audit component which is configurable to meet a specific need of a user. Custom audit components can be used in combination with standard audit operations. For example, standard audit operations are performed at one or more audit points to generate a set of audit attributes. A custom audit operation or custom audit verification is performed on the audit attributes resulting from the standard audit operation or custom audit attributes. In one example, the custom audit verification rule generates an alarm based on a custom audit attribute updated by a custom audit operation for counting the number of event records that exceed a defined threshold.

In another exemplary embodiment, sets of audit behavior are defined. The audit behaviors are configurable. A defined audit set includes one or more audit attributes, audit operations, or audit verification rules which are relative to a particular audit behavior (e.g., a particular item a user wants to bill). Each audit attribute, audit operation or audit verification rule can be uniquely configurable or a standard audit component. At each collector or audit server, the sets of audit behaviors can be enabled or disabled.

For example, a volume audit behavior can be defined as an audit set. The volume audit behavior is used for billing users on the amount of data transferred to a user. The volume audit behavior audit set includes audit attributes and audit operations located within a collector to add the amount of data transferred into the collector associated with a user, and the amount of data transferred out, and the amount of data filtered out by the collector scheme. The volume audit behavior audit set includes an audit verification rule for verifying if the amount of data associated with a user transferred into the collector is equal to the amount of data transferred out plus the amount of data filtered out by the collector. If that data is not equal, the audit verification rule writes an alarm to an audit log file or perform other reporting and notification. This volume audit behavior audit set can be enabled (or disabled) at any collector where it is desired to track volume audit behavior.

For illustration purposes, first data collector 32 is shown. FIG. 5 illustrates audit data collection by auditor 102 within collector 32. Collector 32 includes an encapsulator 220 (E1), aggregator 222 (A1) and data storage system 224 (D1).

In the exemplary embodiment illustrated, auditor 102 includes audit point 310 at encapsulator 220 and audit point 315 are located at aggregator 222. Audit operation 314 and audit operation are associated with audit point 240. Audit operation 316 is associated with audit point 312. An audit operation extracts a metric or performs a calculation to obtain the value of an audit attribute (e.g., an NME form). Audit operation 314 and 315 are performed at audit point 310 to obtain attribute 320 and attribute 321, and audit operation 316 is performed at audit point 312 to obtain attribute 322. Auditor 102 (or audit server 48) processes the audit attributes 320, 321,322 using audit rule 324.

The following sections describe three entities (e.g., audit points, audit operations and audit NMEs) within the audit data collection process.

Audit Points. Collector 32 includes audit points, indicated at audit point 310 within encapsulator 220 and audit point 312 within encapsulator 222. Audit points 310, 312 are configurable programmatic hooks that trigger audit operations when usage data flows through collector 32. In the exemplary embodiment illustrated, audit points are present at the encapsulator 220, indicated as audit point 310, and aggregator 222, indicated as audit point 312, as components of collector 32. In one aspect, audit points are not embedded in the data store 224. The audit subsystem stores audit data in the data store, and so the audit subsystem cannot provide an independent review of its operation. Nevertheless, certain operations of the data store are written to the audit log associated with in collector 32. The data store 204 generates log messages and operational audit messages about the persistence of usage data to the data store and the movement of usage data (due to aging, for example).

Encapsulator Audit Points. Since the encapsulator interfaces directly with usage data input sources, audit points in the encapsulator are positioned to capture metrics such as type of input data sources, the volume of usage records entering the collector, and any errors that occur during the input of usage records. Such audit information is stored in the form of input data set audit NMEs and input sources audit NMEs as described in "input data set audit NME" and "input source audit NME" below.

Aggregator Audit Points. The aggregator audit points capture metrics and errors before and during the processing of usage data by aggregation schemes. Audit data captured at the aggregator includes such information as the number of input or output records per scheme, number of records aggregated, number of records failing validation, counts of specific types of input or output records, and so on. The following is an example of audit points for collecting audit data when usage data enters or leaves the aggregator:

TABLE 1

Aggregator Audit Points

| Name | Purpose |
| --- | --- |
| AggregatorInput | To audit all NMEs coming into the Aggregator. |
| AggregatorFlush | To audit information available at flush time. |
| AggregatorPurge | To audit metrics from the datasets that are being purged. |

An aggregator contains one or more aggregation schemes set up in parallel. The following is an example of audit points for collecting audit data when the usage data enters an aggregation scheme.

TABLE 2

Aggregation Scheme Audit Points

| Name | Purpose |
| --- | --- |
| AggregationSchemeInput | To audit all NMEs coming into the scheme. |

Rules are the primary site at which audit data can be collected. Audit points are embedded in certain standard rules as illustrated in table 3.

TABLE 3

Rule Audit Points

| Rule | Point | Purpose |
| --- | --- | --- |
| Aggregation Rule | Create | To audit when new NMEs (Leaf nodes) are created in the aggregation tree. |
| | Aggregate | To audit when NMEs are aggregated, or merged with other NMEs in the aggregation tree. |

TABLE 3-continued

Rule Audit Points

| Rule | Point | Purpose |
| --- | --- | --- |
| FilterRule | Filter | To audit NMEs filtered out by this rule. |
| Business Rule | Filter | To audit NMEs filtered out by this rule. |
| Conditional Rule | True | To audit NMEs when the condition is true. |
| | False | To audit NMEs when the condition is false. |
| Flush Processor | Store | To audit NMEs to be flushed (stored). |
| StoreRule | Store | To audit NMEs stored. |

Figure 6:
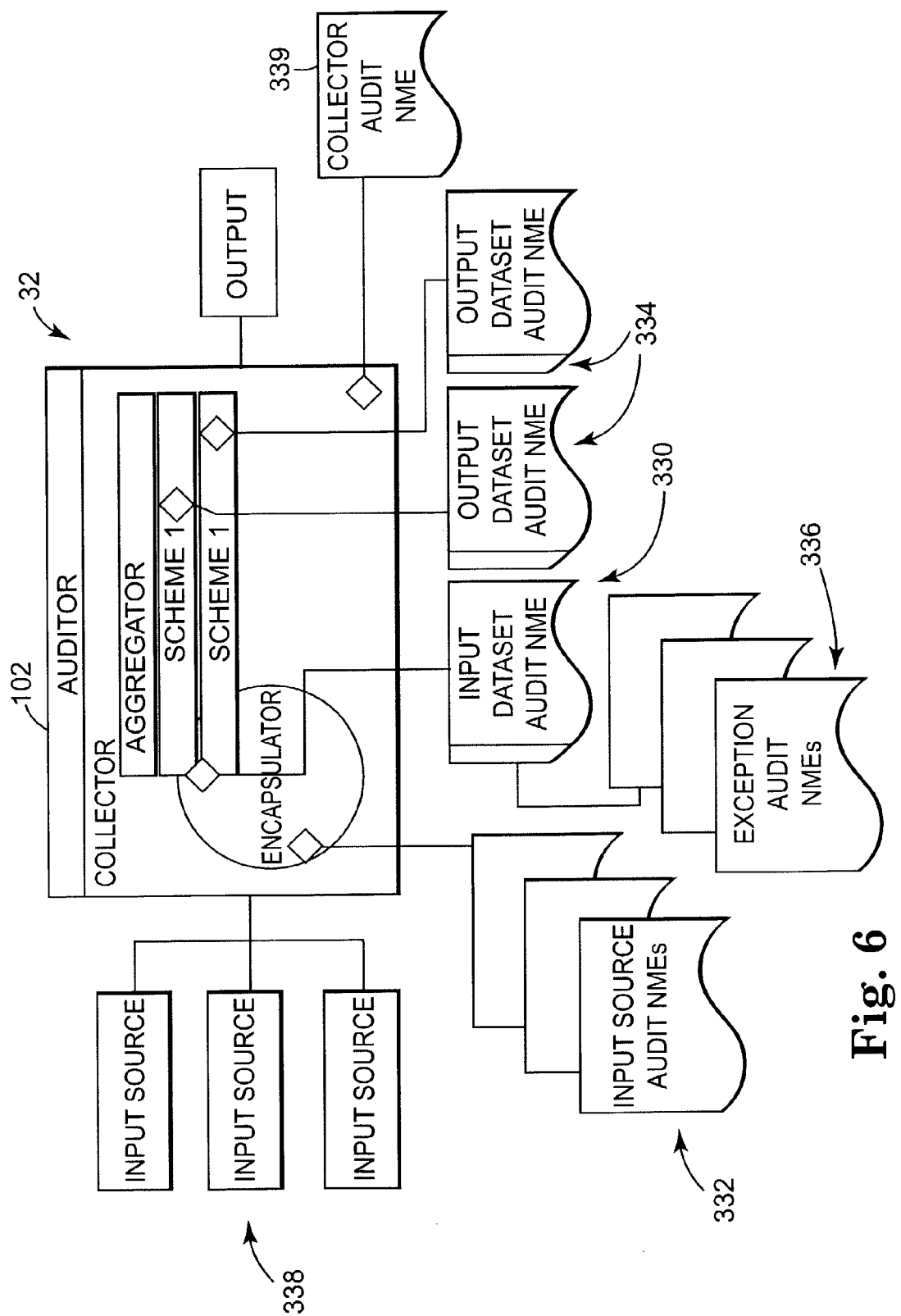
FIG. 6 is a block diagram illustrating one exemplary embodiment of audit normalized metered events within the network usage data recording and auditing system of FIG. 5.

Audit NMEs. Auditors take advantage of the usage data NME schema to hold audit information in NME attributes dedicated to auditing. Audit NME attributes are like other NME attributes except audit NME attributes are used only for auditing. Information can be captured specific to a specific deployment by extending the NME schema with custom audit attributes. FIG. 6 illustrates one exemplary embodiment of generation of audit NMEs associated with a collector (e.g., collector 32). In one aspect, the auditor 102 employs four types of audit NMEs: input data set audit NMEs 330, input source audit NMEs 332, output data set audit NMEs 334, and exception audit NMEs 336. In one embodiment, the input data set audit NME and the output data set audit NME are customized.

Depending on the configuration, a collector may gather usage data from multiple input sources 338 and combine that information when it flushes to the data store. Audit information for a collector may thus include data from several input sources. The auditor 102 uses one input source audit NME 332 for each input source 338.

Collector 32 also includes collector audit NMEs, such as collector audit NME 339. A collector audit NME is an NME associated with overall collector behavior. For example, a collector audit NME may track the number of data sets produced since collector start-up.

In one exemplary embodiment, the input source audit NMEs have the following attributes:

TABLE 4

Input Source Audit NME

| Audit Attribute | Description |
| --- | --- |
| DatasetSourceInfo | The source of the dataset indicated as follows: leaf file collector: [<host>:]<file name> non-leaf collector: <collector>/<scheme>[/<DatasetID>] leaf GSN collector using GTP': <GSN host>/<port> |
| DatasetSourceType | An integer value indicating the type of the input data source as follows: 0: Unknown 1: Another collector 2: A file 3: Network source (eg. GTP') |
| SourceStart | Byte offset to the start of the input file or the start time for the flushset |
| SourceEnd | Byte offset to the end of the input file or the end time for the flushset |
| SourceEOF | End of File marker for a file source 0: Input was not processed through the end of input source 1: Input was processed through the end of the input source |
| SourceNMEsIn | Number of NMEs received from that source |

The input data set audit NMEs 330 hold audit information related to each flushed batch of data entering the collector. In one exemplary embodiment, the input data set audit NME 330 consists of the following attributes:

TABLE 5

Input Dataset Audit NME

| Audit Attribute | Description |
|---|---|
| DatasetExceptions | The number of exceptions found in the dataset |
| DatasetFlushTime | The time at which the dataset was flushed |
| DatasetID | A unique integer representing the dataset or flushset, incremented by 1 for each new flush |
| DatasetNMEsIn | The number of NMEs that were sent to the aggregator for the current dataset or flushset. This attribute is available only if the Dataset Audit "NME Count" audit set is selected. |
| EndTime | The end time of the NMEs flushed. |
| Info | The name of the file that contains the audit usage information. |
| SourcesNumIn | Number of input sources. |
| StartTime | The start time of NMEs flushed |

An output data set audit NME 334 is defined as an NME for each data set that enters an aggregation scheme. In one exemplary embodiment, an output data set audit NME has the following attributes:

TABLE 6

Output Dataset Audit NME

| Audit Attribute | Description |
|---|---|
| SchemeNMEsIn | The number of NMEs that were received by the aggregation scheme for the current dataset. |
| SchemeNMEsAggregated | The number of NMEs in the dataset that were aggregated, or merged with other NMEs. |
| SchemeNMEsCreated | The number of NMEs (leaf nodes, not NMEGroups) created in the aggregation tree by the aggregation scheme. |
| SchemeNMEsFiltered | The number of NMEs in the dataset dropped from processing by the aggregation scheme. |
| SchemeNMEsOut | The number of NMEs set out from the aggregation scheme for the dataset. |

Exception Audit NMEs 336 enable a user to capture audit metrics on an NME having an error so that it can be reconciled later. The auditor 102 enables one to gather metrics about NMEs at two levels of granularity: data set or flush set and individual usage NME. In many cases, the data set or flush set granularity is sufficient. But when an error occurs with a specific NME, one may desire to capture audit metrics on that NME so the error can be reconciled later.

For example, if a session logout message was missed, exactly which session ID had a missing logout is identified. If a parse error occurs in the data set input, it is desirable to know not only how many parse errors occurred but also where they occurred.

Exception audit NMEs are created whenever an exception condition is encountered while processing data. These NMEs are populated with enough information for a user to be able to identify the problem encountered and trace back to the record that caused the problem. In one exemplary embodiment, for each exception the following information is recorded in the NME.

TABLE 7

Exception Audit NME

| Audit Attribute | Description |
|---|---|
| AuditExceptionID | Identifies the exception, enabling a user to correlate the exception to the error condition. The list of IDs is as follows:<br>1 - NME sequence error recorded in a GPRS session<br>2 - Duplicate logout detected in GPRS session<br>3 - Duplicate login detected in GPRS session<br>4 - Duplicate interim record detected in GPRS session<br>5 - A error has occurred while parsing an input record<br>6 - The logout for the previous session and the login for the current session are missing<br>7 - The login for the current session is missing<br>8 - The logout for the previous session is missing<br>9 - A duplicate login has been detected and will be dropped<br>10 - An interim GPRS Session record has been upgraded to an end. The end record was probably lost<br>11 - An interim GPRS Session record has been upgraded to an start. The start record was probably lost<br>12 - Could not find a matching session for usage with IP address.<br>13 - Usage NME matches more than one session. |
| Audit ExceptionNMED | Identifies the usage NME context associated with the exception. For example, the GPRS sequence number and ID of the session record (<SessionID><SequenceNumber>) |
| Audit ExceptionSource | Identifies the scheme name in which the error was generated to help you locate the source of the exception. |

Audit Operations. An audit operation extracts a metric or performs a calculation to obtain the value of an audit NME attribute. Audit operations read usage NME attributes, but do not modify them. For example, a user might count all the NMEs filtered out at the flush processor. The audit operation would simply add one to an audit NME attribute for each NME filtered out. The following table provides examples of audit operations.

TABLE 8

Audit Operations

| Operation | Description |
|---|---|
| A1, add, A2 | Add the value of A2 to A1. |
| A1, subtract, A2 | Subtract the value of A2 from A1. |
| A1, min, A2 | Store the smaller of A1 and A2 in A1. |
| A1, max, A2 | Store the larger of A1 and A2 in A1. |
| A1, set, A2 | Copy the value of A2 to A1. |

Session Audit. Session auditing is utilized as part of an error recovery process to provide information needed to find, repair, and process billable records that would otherwise have been lost. In one exemplary embodiment, a basic session collector supports session open, session continuation, and session close records. Ideally, complete records are received in order. In practice, however, records coming into the network usage data recording system are occasionally missing, out of order, or duplicates, which may result in lost revenue or customer overcharges. Auditing can provide the information a user needs to find, repair, and process billable records that would otherwise have been lost. The following table lists exemplary session audit points:

TABLE 9

Simple Session Audit Points

| Name | Purpose |
|---|---|
| MissingLogins | To audit missing logins |
| MissingLogouts | To audit missing logouts |
| DuplicateLogins | To audit duplicate logins |
| Logins | To audit logins |
| Logouts | To audit logouts |
| MissingLoginAndLogout | To audit missing logins and logouts |

The following table illustrates example audit information captured:

TABLE 10

Simple Session Audit Information

| Audit Attribute | Description |
|---|---|
| SessionMissingLogins | Number of missing login records |
| SessionMissingLogouts | Number of missing logout records |
| SessionDuplicateLogins | Number of duplicate login records |
| SessionLogins | Number of login records |
| SessionLogouts | Number of logout records |
| SessionMissingLoginAndLogout | Number of sessions with missing logins and logouts |

The following table illustrates one exemplary embodiment of general packet radio service (GPRS) session audit points.

TABLE 10.1

GPRS Session Audit Points

| Audit Point Name | Purpose |
|---|---|
| DuplicateLogouts | Count the number of duplicate logout records per scheme |
| DuplicateLogins | Count the number of duplicate login records per scheme |
| Logins | Count the number of login records per scheme |
| Logouts | Count the number of logout records per scheme |
| EndUpgrades | Count the number of interim records that have been upgraded to start records |
| StartUpgrades | Count the number of interim records that have been upgraded to end records per scheme |
| DuplicateInterims | Count the number of duplicate interim records |
| Interims | Count the number of interim records |
| StandAlones | Count the number of standalone records |
| Gaps | Count the number of gaps in the session |
| HandOvers | Count the number of SGSN handovers |

The following table illustrates one exemplary embodiment of GPRSsession audit data.

TABLE 10.2

GPRS Session Audit Data

| Audit Data Name | Description |
|---|---|
| GPRSSessionDuplicateLogins | Number of session logins that have duplicate IDs |
| GPRSSessionDuplicateLogouts | Number of session logouts that have duplicate IDs |
| GPRSSessionLogouts | Number of logouts records received per scheme |
| GPRSSessionLogins | Number of login records received per scheme |
| GPRSSessionEndUpgrades | Number of interim session records that were upgraded to end records |
| GPRSSessionInterims | Number of interim session records |
| GPRSSessionStartUpgrades | Number of interim session records that were upgraded to start records |
| GPRSSessionStandalones | Number of standalone sessions |
| GPRSSessionGaps | Number of gaps (ie missing records) in the session |
| GPRSSessionHandOvers | The number of SGSN handovers that occur |
| GPRSSessionDuplicateInterims | Number of duplicated interim session records |

The following table illustrates one exemplary embodiment of correlation audit data.

TABLE 10.3

Correlation Audit Data

| | |
|---|---|
| SessionNMEsIn | Number of session NMEs seen by this rule during each flush. This number can be cross checked with any downstream session collector's session login/logout counts during the same time period or dataset to determine if any data (billable sessions) has been lost between collectors. |
| UsageNMEsIn | Number of usage NMEs seen by this rule during each flush. This number is also useful to cross check with the downstream collectors. |
| SchemeNMEsCorrelated | Number of correlated NMEs—the number of usage NMEs correlated to sessions during this flush. Normally, this number matches the Number of Usage NMEs. |
| SchemeNMEsUncorrelated | Number of uncorrelated NMEs—the number of usage NMEs that could not be correlated with a session. A non-zero value in this count indicates that revenue is being lost since usage records cannot be matched with session records and thus cannot be billed. This could happen if the provisioning system is misconfigured, if a switch is misconfigured, or if fraud is occurring. This count is an important flag that something is wrong and action to understand and resolve the problem is needed. |
| Exception audit NMEs on uncorrelated NMEs | When an NME is uncorrelated, it may be useful to understand why it was not correlated to help identify what actions are required to stem revenue loss. There are two possible reasons with these rules: No session matching the usage IP address (or IP address range) exists. Two or more sessions existed for the usage IP address during the usage time period. |

Audit Data Processing. Audit data processing by each auditor involves audit verification, in which the auditor validates the NME counts and more complex audit NME transformations affected by audit rules. The auditor performs audit data processing functions within the aggregator. The auditor checks usage data and audit information to validate and reconcile the information and generate operational audit log entries. The auditor applies a rule chain to the audit NMEs in order to perform additional validation or adornment before passing it to the data store. The auditor resets the data set, source, and scheme audit attribute values after then are persisted to the data store.

Audit verification. In addition to collecting and reporting audit data, the audit subsystem can also verify that the usage data was processed correctly using audit rules. A user can also create new rules to customize the audit subsystem.

One such audit rule verifies the number of NMEs flowing through each aggregation scheme. When the "NME count" audit set is selected during configuration, the audit subsystem verifies that the following equation is true and logs a warning if false:

NME Verification Example $$I=F+A+D \qquad 1.$$

I: Number of NMEs coming into the aggregation scheme
F: Number of NMEs filtered out
A: Number of NMEs aggregated (that is, merged with other NMEs)
D: Number of NMEs sent to the datastore by the aggregation scheme.

For example, if 100 NMEs come into a scheme, 25 are filtered out, and 35 are aggregated, the number of NMEs going out should be 40. If the counts are correct, this information is logged only in the collector's log file. If the counts are not correct, the information is also logged in the audit log file. A user can create a custom audit rule to accomplish the same function for session collectors.

Audit Data Storage. Audit data is stored along with the usage data in the local data store of each audited collector. The auditor employs the data storage component to store audit data. If the audited collector does not use the component, the auditor creates the component and incorporates the existing data store.

The data store ordinarily creates one backing store for each scheme in order to store usage data. If auditing is enabled, the data store creates two additional backing stores to manage global audit statistics such as source file name, number of records processed successfully and number of records with errors, for example. The stores are transactionally updated at flush time.

The data store generates log messages and operational audit messages about the persistence of usage data to the backing store and the movement of usage data.

In general, audit data ages at the same time as or later time than usage data. In one aspect, the auditor supports two aging policies for audit data:aging based on NME flush time, aging based on the number of data sets, and aging based on end time. In one aspect, audit data is aged according to the same policy as usage data. As the usage data sets are selected (by data set ID) for deletion, the corresponding audit data sets are also identified.

Monitor Auditing. The auditor includes an operational audit component that can help resolve discrepancies in the audit trail. This component captures such operational events as switch or collector unavailability and errors in the source file. In one aspect, operational log events are captured in two log files. The first log file is a collector log. The collector log file contains various auditor messages that refer to errors, warnings, informational notes, and other operational results. The collector log file also includes audit attributes and the results of the audit verification process. The second log file is the audit log. The audit log file contains audit-related messages such as errors, informational notes, and results depending on the log level configuration as well as audit data. In one aspect, the audit log only tracks events relevant to the verification and reconciliation of the audit trail.

In reference to FIG. 4, the network usage data recording system 30 is a flexible, configurable system. The first data collector 32, second data collector 34, third data collector 36, fourth data collector 38, first correlator collector 40, second correlator collector 42, aggregator collector 44 (hereinafter as a group referred to as "collectors") are all formed from the same modular collector components (i.e., an encapsulator, an aggregator, and a data storage system) as previously described herein. Each component includes an auditor. Each component that makes up each of these collectors is individually configurable. The configuration information for each of these collectors is stored at a centralized location at the configuration server 48, and managed by configuration server 48. Similarly, the auditor configuration information for each auditor is stored at a centralized location at the audit server 48. At start-up, the collectors query the configuration server to retrieve its configuration query the audit server to retrieve its audit configuration. Other applications that interact with the collectors also query the configuration server to locate the collectors. The following paragraphs illustrate one exemplary embodiment of collector architecture in detail.

Figure 7:
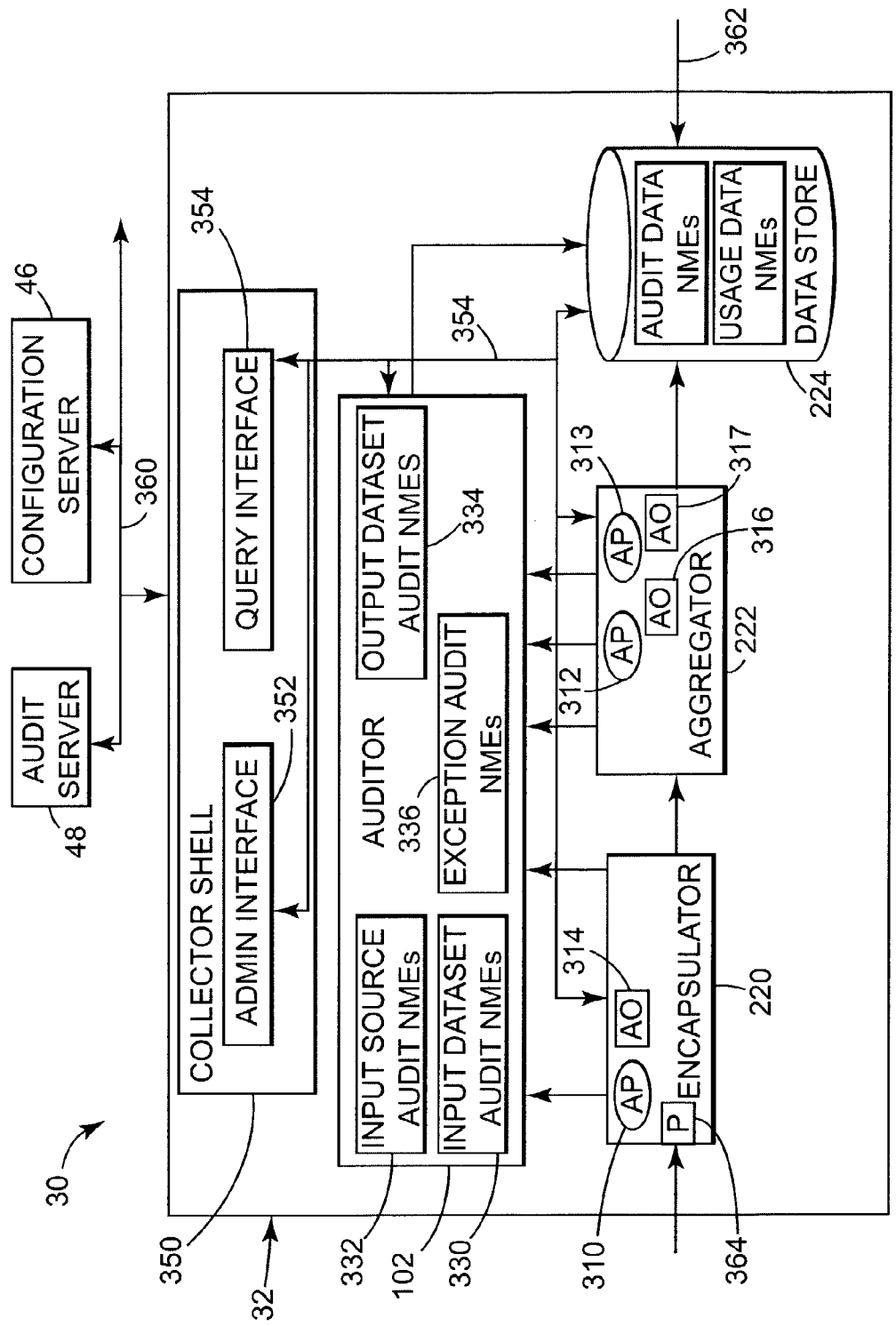
FIG. 7 is a block diagram illustrating another exemplary embodiment of a collector for use with a network usage recording system according to the present invention.

Collector Architecture. Collectors 32, 34, 36, 38, 40, 42 and 44 comprise three configurable components that are similar to the collectors previously described herein. In FIG. 7, a block diagram is shown illustrating one exemplary embodiment of the basic architecture for each of the configurable collectors. The collector architecture enables the same basic components to be used to perform different functions within the network usage data recording system based on how the components are configured. As such, the collector 32 can be configured to operate as a data collector, a correlation collector ("a collector of collectors"), an aggregator collector, etc. In one preferred embodiment, the collector is defined by a configurable Java object class.

For discussion purposes, the collector architecture is described in reference to the first data collector 32. Collector 32 includes an encapsulator 220, an aggregator 222, and a data storage system 224. The encapsulator 220 operates to read raw usage information from a metered source and convert it to a standard data format, and in particular, convert it to normalized metered events (NMEs). The encapsulator 220 is configurable for reading and converting usage data from a variety of data sources. The aggregator 222 processes the NMEs. This process mainly involves combining like NMEs together to achieve data reduction, but may also include other processing such as filtering and adorning the data by adding or modifying attributes in the NMEs. The aggregator 222 operates to periodically flush the NMEs to the data storage system 224. The data storage system 224 is responsible for storing the NMEs. The data storage system 224 also supports queries so other collectors or applications can retrieve specific sets of data (e.g., for specific time intervals) from the data storage system 224.

As usage data passes through and is processed via encapsulator 220 and aggregator 222, auditor 102 operates to collect audit metadata corresponding to the usage data based on where the usage data is in the collector system. In one aspect, auditor 102 includes audit points in encapsulator 220 and aggregator 222, illustrated by audit point 310 having audit operation 314 in encapsulator 220 and audit point 312 having audit operation 316 and audit point 313 having audit operation 317 and aggregator 222. The audit attributes generated at these audit points are provided to auditor 102, indicated by input source audit NMEs 332 input dataset audit NMEs 330 exception audit NMEs 336 and output dataset audit NMEs 334. The collected audit NMEs are stored along with the usage data NMEs in data store 224.

The encapsulator 220, aggregator 222 and data storage system 224 are each separately configurable components of collector architecture 32. As such, each component can be changed without impacting the other components. The configuration server 46 stores configuration data for each collector and data storage system 224 and audit server 48 store audit configuration data for each auditor.

Collector 32 further includes a collector shell 350 in communication with encapsulator 220, aggregator 222 and data storage system 224. In particular, collector shell 350 includes collector operator/admin interface 352 and query interface/manager 354. Collector operator 352 is in communication with auditor 330, encapsulator 220, aggregator 222 and data storage system 224 via communication bus 354. Collector shell 350 operates as an interface between configuration server 46 and encapsulator 220, aggregator 222 and data storage system 224, and as an interface between audit server 48 and auditor 102. At start-up, the collector shell 350 queries the configuration server 46 to retrieve the configuration data from configuration server 46 that is specific to collector 32, for encapsulator 220, aggregator 222 and data storage system 224, and queries audit server 48 to retrieve audit configuration data specific to auditor 102.

Query manager 354 operates as an interface between data storage system 224 and/or aggregator 222 and other collectors that query data storage system 224 to obtain usage data stored therein. The query manager 354 communicates with other collectors or applications via communication link 360. Alternatively, data storage system 224 may be directly accessed via communication link 362.

Encapsulator 220 reads metered usage information from a metered source (e.g., network data sources 90, 92, 94, 96). The encapsulator 220 converts the usage information to normalized metered events (NMEs). The function of encapsulator 220 is configurable based on the type of usage information the encapsulator receives and converts into NMEs. In one exemplary embodiment, the types of encapsulators include a demo encapsulator, a rolling file encapsulator, a directory encapsulator, a UDP encapsulator, a telnet encapsulator, an SNMP encapsulator, a collector encapsulator and a polling mux encapsulator. The demo encapsulator allows a stream of NMEs to be generated. The fields in the NMEs and their values can be controlled. This type of encapsulator is useful for demonstrating the network usage data recording system, testing aggregation schemes and Internet data record formatting. The rolling file encapsulator reads event data from log files and produces NMEs to be aggregated (data reduction) at the aggregator level. The directory encapsulator reads event data from all the files in a directory. This type of encapsulator can be used for batch processing.

The UDP encapsulator reads event data exported by certain network devices and produces NMEs to be processed by the aggregator 222. One suitable network encapsulator processes NetFlow datagrams that are exported by any NetFlow-enabled device. The telnet encapsulator attaches to a system via telnet commands and issues certain accounting commands to retrieve usage information. One embodiment of using this encapsulator is the retrieval of IP accounting from routers commercially available under the trade name CISCO. The Simple Network Management Protocol (SNMP) encapsulator is used to retrieve event data from a source via SNMP. The collector encapsulator retrieves NME data that has already been processed by other collectors. This type of encapsulator could be used in a correlator collector or an aggregator collector. The polling mux encapsulator can run several polling based encapsulators (the collector encapsulator, telnet encapsulator or SNMP encapsulator) in parallel. Correlators use this type of encapsulator. The attributes for the above encapsulators define how NMEs are obtained from an input log file, network or other collectors.

In one embodiment, encapsulator 220 includes parser 364. The role of parser 364 is to parse event data received by the encapsulator and create an NME to be processed by aggregator 222. The NMEs are made up of attributes such as a usage records start time, end time, source IP address, destination IP address, number of bytes transferred, user's login ID and account number, etc. The parser 364 is configured to recognize event fields from the input source and map each one (i.e., normalize them) to an NME format. Alternatively, an encapsulator may not need a parser.

NMEs are composed of attributes that correspond with various fields of some network usage event. The attributes can be of several different types, depending on what type of data is being stored. In one exemplary embodiment, the network usage data recording system may include the following attribute types:

TABLE 11

Attribute Types

| Type | Description |
| --- | --- |
| StringAttribute | Used to store ASCII text data |
| IntegerAttribute | Used to store 32 bit signed integers |
| IPAddrAttribute | Used to store an IP address |
| TimeAttribute | Used to store a date/time |
| LongAttribute | Used to store 64 bit signed integers |
| FloatAttribute | Used to store 32 bit single precision floating point numbers |
| DoubleAttribute | Used to store 64 bit double precision floating point numbers |

Each NME attribute (i.e., NME field) is mapped to an attribute type. The following table lists one exemplary embodiment of NME attribute names, with their associated type and description.

TABLE 12

| Names | Type | Description |
| --- | --- | --- |
| StartTime | TimeAttribute | The time the event began |
| EndTime | TimeAttribute | The time the event ended |
| SrcIP | IPAddrAttribute | The IP address of the sender |
| DstIP | IPAddrAttribute | The IP address of the receiver |
| SrcPort | IntegerAttribute | The port number of the sender |
| DstPort | IntegerAttribute | The port number of the receiver |
| NumPackets | IntegerAttribute | The number of packets |
| NumBytes | IntegerAttribute | The number of bytes |
| SrcIPStart | IPAddrAttribute | The start of a range of IP addresses |
| SrcIPEnd | IntegerAttribute | The end of a range of IP addresses |
| TxBytes | IntegerAttribute | The number of bytes transmitted |
| RxBytes | IntegerAttribute | The number of bytes received |
| TxPackets | IntegerAttribute | The number of packets transmitted |
| RxPackets | IntegerAttribute | The number of packets received |
| SrcAS | IntegerAttribute | The autonomous system number of the source |
| DstAS | IntegerAttribute | The autonomous system number of the destination |
| SrcPortName | StringAttribute | The string name of the source port |
| DstPortName | StringAttribute | The string name of the destination port |
| LoginState | StringAttribute | The state of a login event |
| RouterID | Attribute | The router ID of the router producing the event |
| LoginID | StringAttribute | The login ID of the user producing the event |
| AcctNum | StringAttribute | The account number of the entity responsible for the event |

Other NME attributes may be utilized. Other NME attributes will become apparent to those skilled in the art after reading the present application.

Aggregator 222 receives a stream of NMEs from encapsulator 220 and operates to process, filter, and organize the NME data. Typically, the aggregator process results in a reduction in the amount of data. In particular, each normalized metered event collected at the encapsulator 220 is pushed to the aggregator 222 and stored in an aggregation tree. The aggregator 222 creates the aggregation tree. How the nodes or branches of the aggregation tree are established depends on a set of configurable rules, termed a rule chain. Rules in a rule chain are applied to inbound NMEs by the rule engine, a logical entity existing in the aggregator. The bottom nodes or "leaf" nodes of each aggregation tree are termed aggregated NMEs. The aggregated NMEs are stored in data storage system 224, indicated at 370.

How often the aggregated NMEs are stored in the data storage system 224 depends on a configurable policy called a "flush policy." When NMEs are stored to the data storage system 224, the encapsulator recovery information (ERI) of the last successfully stored NME is also saved in the data storage system 224 to provide a checkpoint for recovery if necessary.

A simple collector consists of a single aggregation scheme containing a single chain of rules to construct an aggregation tree. Alternatively, the collector configuration may include multiple aggregation schemes or a correlation aggregation scheme for correlating collectors. In particular, if it is desired to organize inbound NMEs into multiple aggregation trees, the aggregator can be configured to add additional aggregation schemes under a single collector. In this embodiment, an inbound NME is processed by each rule chain and aggregated into each tree following its separate rule policy. One exemplary use of a multiple aggregation scheme would be for gathering two types of usage data in a single collector. For example, detailed usage data (e.g., grouped by source address, destination address and destination port) may be aggregated using one scheme and summary usage information (e.g., only grouped by port to identify protocol distribution) may be aggregated using another aggregation scheme. The separate aggregation schemes are then stored in separate tables or files in the data storage system (i.e., persistent storage), because each may aggregate different fields from the input NMEs.

In regard to correlation aggregation schemes, correlating usage events with session events is considered a special case of aggregation. In this embodiment, a single aggregation scheme (and aggregation tree) is manipulated using two different rule chains. The first rule chain is used for organizing session NMEs, and the second rule chain is used for locating the appropriate session in the tree for inbound usage NMEs.

A collector's aggregation policy is controlled by its configuration. The configuration for embodiments of an aggregator is structured as follows:

Aggregator: There is always exactly one aggregator object configured per collector. The configuration of this aggregator specifies the aggregation scheme (or schemes) to be used.

Flush Policy: The flush policy controls when aggregated NMEs are moved from the in-memory structures to the persistent data storage system. When choosing this policy the cost of recovery is balanced versus the amount of aggregation to be achieved. There is only one flush policy per collector.

Aggregation Scheme: There may be one or more aggregation schemes configured for a collector. Each aggregation scheme has a sequence of rules configured that control how the aggregation tree is assembled. In the case of correlation, two rule chains are configured for a single aggregation scheme.

Rules: Rules are the building blocks for constructing an aggregation scheme. The rules control how the aggregation tree is constructed, and how NMEs are manipulated and stored as they pass through the aggregation tree.

The data storage system 224 has two primary functions. First, the data storage system 224 provides persistent storage of all aggregated NMEs (usage data NMEs and audit data NMEs) and recovery information. In particular, aggregated NMEs are periodically flushed from the aggregator 222 to the data storage system 224. At that time, recovery information is also persistently stored in the data storage system 224. The recovery information is the collector state information that is used during crash recovery. In particular, when an encapsulator is reading from a file, the recovery information indicates the encapsulator's position in the file at the time the flush occurred. As such, if power is lost and the collector is restarted, the collector operator retrieves the recovery information from the data storage system 224 and send the information to the encapsulator. The encapsulator positions (or repositions) itself at the appropriate point in the data storage system that the encapsulator was reading from prior to the loss of power.

In one aspect, there are three types of data storage systems 224. In a first embodiment, the data storage system is used to store the NMEs themselves and the metadata related to the stored NMEs. Further, the system audits metadata related to the usage metadata in a database. In a second embodiment, the data storage system uses the underlying file system to store the actual NMEs. Usage metadata and audit metadata related to these NMEs are stored in the data storage system. Significant performance advantages can be achieved with this data storage system when large volumes of NMEs are being stored. In one preferred embodiment, the second type of data storage system is used only with usage sources. The third type of data storage system stores the usage and audit NMEs in Internet data record (IDR) format in ASCII files. IDR formatted output is intended to provide files that are convenient for consumption by external applications. Example formats include character delimited records, Hypertext Mark-up Language (HTML) tables, Extensible Mark-Up Language (XML) structures and fixed width fields. The data storage system 224 supports the query manager for allowing clients to obtain aggregated NMEs based on some query criteria.

Data "Flush" Policy. In reference again also to FIG. 4, each aggregator 224, 228, 234, 242 has a predefined or configured "flush policy." The flush policy or flush interval is defined as the time interval or how often processed or aggregated data is "flushed" or transferred from volatile memory (associated with each aggregator) to persistent storage in corresponding data storage systems 224, 230, 236, 244. Auditor 102 includes an audit data flush policy that typically corresponds to the usage data flush policy. Preferably, the flush policy associated with a collector is coordinated with the flush policy at an adjacent level. In particular, encapsulator 258 (third level) queries data storage system 250 (second level). Similarly, encapsulator 246 queries data storage system 224 (first level) and data storage system 230 (first level). As such, the flush policy of aggregator collector 44 is preferably coordinated with the flush policy of first correlator collector 40. Similarly, the flush policy of first correlator collector 40 is preferably coordinated with the flush policy of session data collector 32 and usage data collector 34. When a flush occurs, the collector (e.g., session data collector 32) writes the aggregated NMEs and audit NMEs to the collector's local data store and then continues processing data. The queries that are coming from upstream or next level collectors are independent. As such, the upstream collector is actively asking for data which, if the upstream collector's query is not coordinated with the flush policy of the downstream collector, the upstream collector will continue to ask for data until the data is available. As such, preferably the upstream or next level collector queries or retrieves information at an interval that is a multiple of the flush rate of the downstream or previous level collector.

In one example, the predefined flush interval or session data collector's 32 aggregator 222 is set to fifteen minute intervals. The query interval for first correlator collector's 40 encapsulator 246 is set for one hour intervals. As such, encapsulator 246 will query data storage system 224 for data from 12:00 to 1:00. The encapsulator 246 retrieves this data, which is the result of four data flushes (at fifteen minute intervals) by aggregator 222 to data storage system 224. First level or downstream collector 32 flushes aggregated data to data storage system 224 at fifteen minute intervals, but the second level or upstream collector 40 retrieves the aggregated data at one hour intervals.

Alternatively, the second level collector 46 may query the first level collector 32 for data at intervals which do not coordinate with the flush intervals of the first level collector 32. For example, usage data collector 32 may have a flush interval of fifteen minutes. Upstream or second level first correlator collector 40 may have a query interval of five minutes. The query intervals requires the second level first correlator collector 40 to continue to repeatedly query the first level usage data collector 32 until the data is available from data storage system 224. Of course, after a flush occurs, the second level first correlator collector 40 can successfully query and retrieve data for three consecutive five minute intervals, since the first level session data collector 132 has a fifteen minute flush interval.

Embodiments of a distributed data storage system according to the present invention provide transactional integrity for data written to each data storage system 224, 230, 236, 244. In reference also to FIG. 7, a block diagram (illustrates) one exemplary embodiment of data storage system 224. The discussion of data storage system 224 is equally applicable to the other data storage systems within the network usage data recording system 30. At each flush of data to data storage system 224, three types of information are stored within the data storage system 224. These three types of information include the aggregated data (aggregated NMEs), metadata and error recovery information (ERI), which are persistently stored in data storage system 224. Aggregated data is simply the aggregated data processed by aggregator 222. Metadata is detailed information about the storing of the aggregated data. The metadata may include details about when the data flush occurred, the time range of the data which was flushed, and includes a pointer or some other indicator to where the data is stored within the data storage system 224. As such, the transactional integrity of the aggregated data is maintained by metadata. Error recovery information may be stored as part of metadata or, alternatively, may be stored separate from metadata. If the error recovery information is stored separate from the metadata, the metadata may include a pointer or locator to the location of the error recovery information within the data storage system 224. The metadata and error recovery infiltration are only updated after a successful data flush has occurred.

When data storage system 224 is queried by another collector or other application (e.g., the API 132), the querying device looks at the metadata to determine if the desired data is stored in data storage system 224, and if so, the location of that data (i.e., aggregated data). In regards to transactional integrity, if an error occurs during the processing of data by aggregator 222 or the flushing of data from aggregator 222 to data storage system 224, the result may be lost data or an incomplete data file written to data storage system 224. As such, the metadata and error recovery information was not changed. The data in error may be reprocessed later in its entirety either through the initial collector if the error was transient, or through the Error Reprocessing System (ERS) after the data has been repaired. Collector 32 looks at the metadata and error recovery information, determines the location of the data for the last complete flush. The collector 32 gives the error recovery information to the encapsulator 220 such that the encapsulator can position itself in the data source (e.g., data storage system 224) at the appropriate point to retrieve the lost data.

Figure 8:
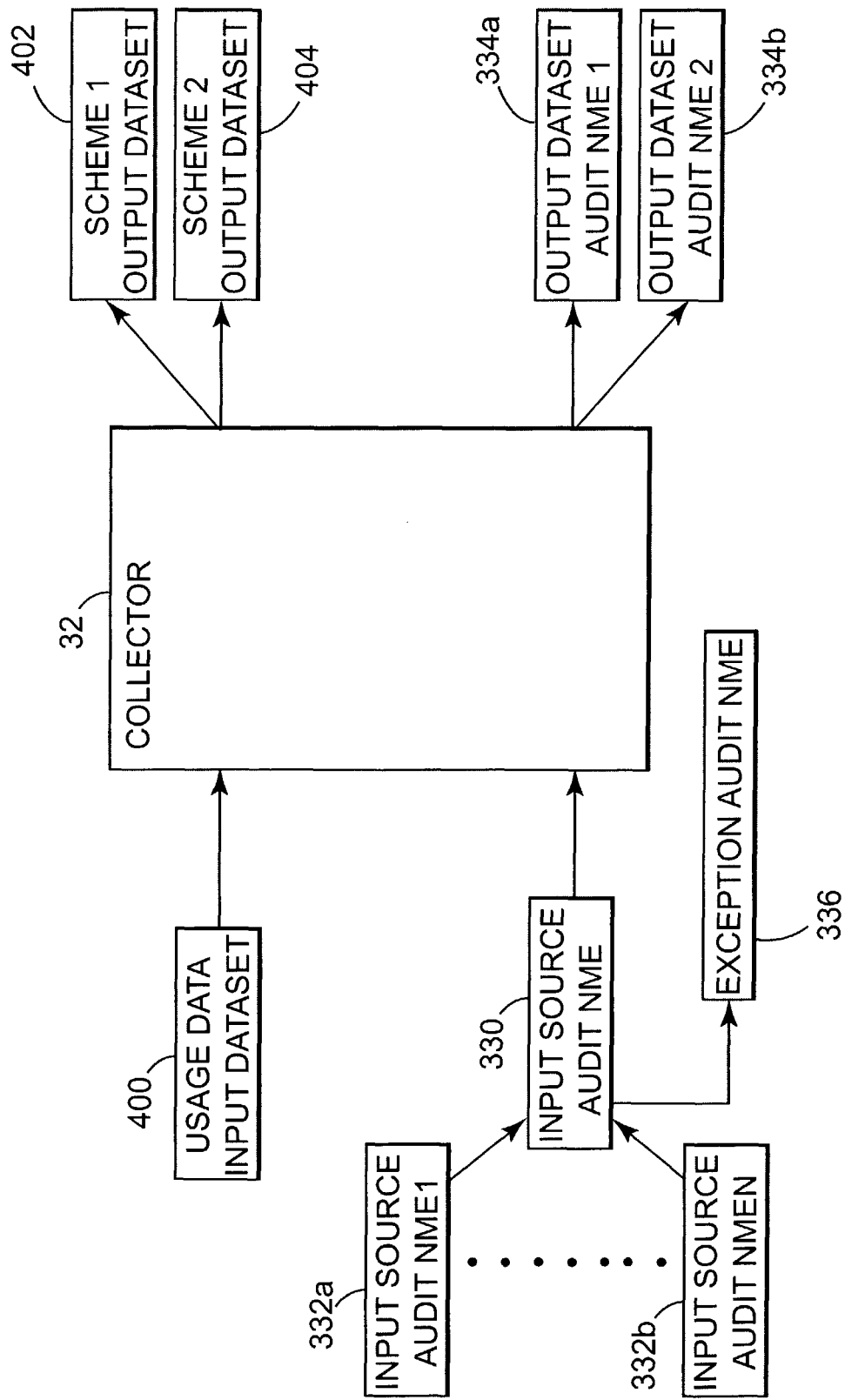
FIG. 8 is a diagram illustrating one exemplary embodiment of collector usage datasets and auditor datasets corresponding to a collector in a network usage data recording system according to the present invention.

FIG. 8 is a block diagram illustrating one exemplary embodiment of data flow through collector 32. The block diagram of FIG. 8 illustrates how audit data sets are mapped one-to-one to collector usage data sets. In one aspect, audit attributes are collected on a flush granularity. In other aspects, audit attributes may be collected and stored with other granularities. Data Delivery Audit preferably occurs after a flush, and Collector Audit may span many flushes. Audit data sets include input source audit NME1 332a through input source audit NMEN 332b, input data set audit 330, exception audit NME 336, output dataset audit NME1 334a and output dataset audit NME2 334b. Input dataset audit NME 330 corresponds to usage data input dataset 400. Output dataset audit NME1 334a corresponds to scheme one output dataset 402. Output dataset audit NME 2 corresponds to scheme two output dataset 404.

Figure 9:
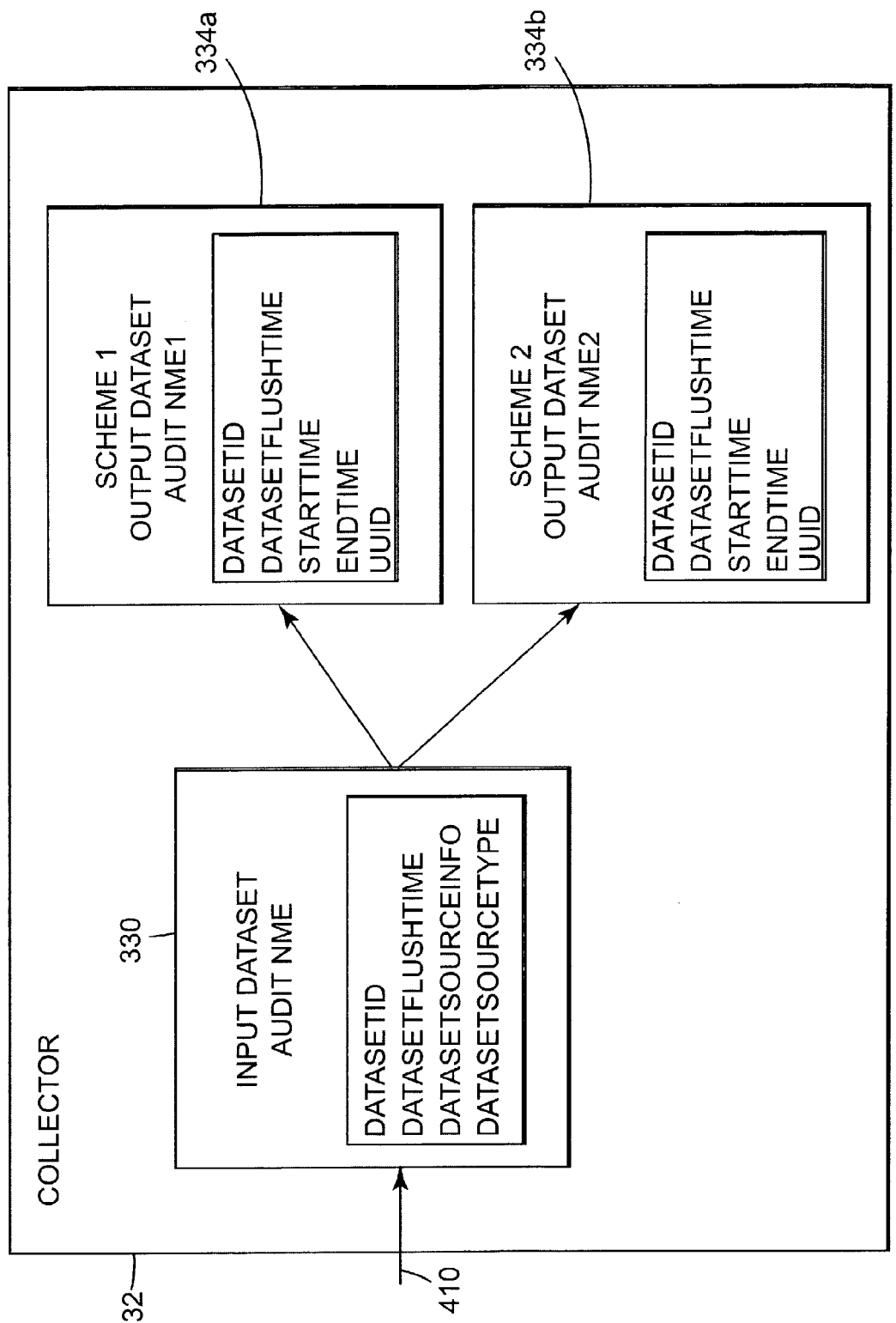
FIG. 9 is a block diagram illustrating one exemplary embodiment of a collector audit scheme used in a network usage data recording and auditing system according to the present invention.

FIG. 9 is a block diagram illustrating one exemplary embodiment of audit dataflow in a collector. Data is input to collector 32 from an input source file or input device, indicated at 410. The auditor located in collector 32 creates input data set audit NME 330. In one exemplary embodiment, input dataset audit NME 330 includes dataset ID, dataset flush time, dataset source info, and dataset source type. Output dataset audit NMEs are generated based on the input dataset audit NMEs. In the exemplary embodiment illustrated, the collector 32 auditor generates scheme one output dataset audit NME1 334a and scheme two output dataset audit NME 334B. Each output dataset audit NME includes a dataset ID, dataset flush time, start time, end time, and User Identification (UUID).

Figure 10:
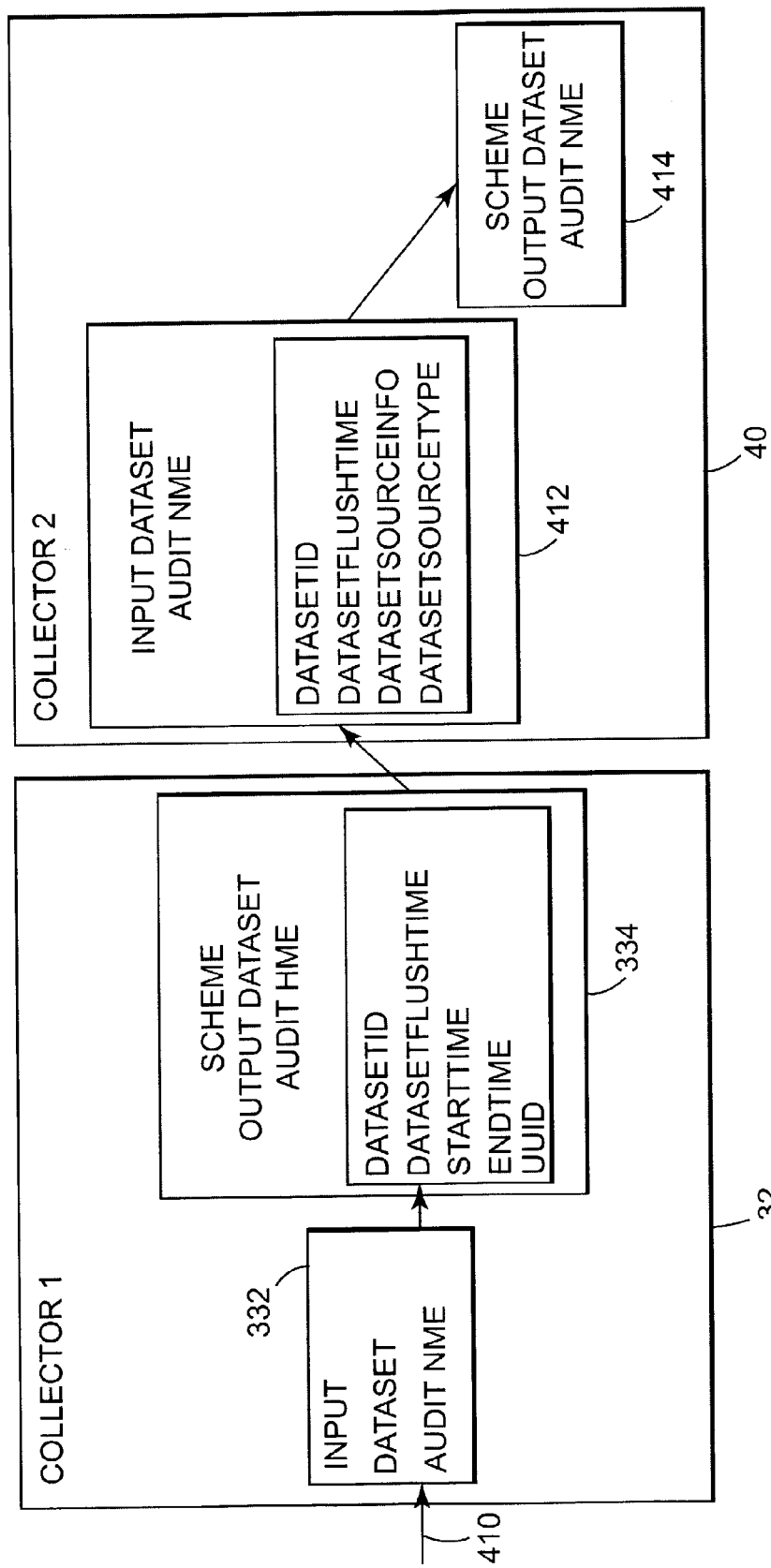
FIG. 10 is a diagram illustrating one exemplary embodiment of a collector to collector audit scheme used in a network usage data recording and auditing system according to the present invention.

FIG. 10 is a block diagram illustrating one exemplary embodiment of tracing audit data flow between collectors, indicated as collector 1 and collector 2. For example, collector 1 is first data collector 32 and collector 2 is first correlation collector 40. Input dataset audit NMEs 332 are generated from input source 410. The auditor generates a corresponding scheme output dataset audit NME 334. The scheme output dataset audit NME 334 includes dataset ID, dataset flush time, start time, end time, and UUID. First correlation collector 40 includes input dataset audit NME 412. The input dataset audit NME 412 includes dataset ID, dataset flush time, dataset source info, and dataset source type. The correlation collector 40 generates a corresponding scheme output dataset audit NME 414. In one exemplary embodiment, the audit server can track data leaks in the system by comparing the scheme output data set audit NME 334 to the input dataset audit NME 412. Similarly, the output data set audit NME of one collector can be compared to the input audit NME of the next collector in the dataflow to detect data leaks between collectors.

What is claimed is:

1. A collector within a plurality of collectors in a network subscriber usage recording system, said collector comprising:
    an encapsulator for reading a plurality of network subscriber metadata records from a network data source and converting the network subscriber metadata records to a plurality of data normalized metered events;
    an aggregator for processing the data normalized metered events to create aggregated normalized metered events;
    a storage system; and
    an auditor for collecting audit metadata from said collector and generating audit normalized metered events based on the data normalized metered events, wherein the auditor transfers the audit normalized metered events from a volatile memory to a persistent storage in the storage system periodically at a constant time interval.

2. The collector of claim 1, wherein one of the audit normalized metered events is a number of the data normalized metered events in a data set dropped from processing by the aggregator further comprising a storage system.

3. The collector of claim 1, wherein the auditor periodically stores the audit normalized metered events in the storage system according to a defined policy.

4. The collector of claim 1, wherein the auditor collects audit attributes, an audit attribute defined as a usage processing metric associated with the data normalized metered events.

5. The collector of claim 1, the auditor further comprising an audit point located in the network subscriber usage recording system where audit attributes are collected.

6. The collector of claim 5, wherein the audit point is located in the encapsulator or the aggregator.

7. The collector of claim 5, further wherein the auditor is configured to perform an audit operation on the audit metadata from said collector at the audit point to generate the attribute.

8. The collector of claim 1, wherein the plurality of network data records comprise a data set, and wherein the auditor is configured to operate on the data set for processing large volumes of network data.

9. The collector of claim 8, further comprising an exception audit applied to the data sets, to enable detailed audit of individual data events to provide fine audit granularity down to individual records or record fields.

10. The collector of claim 1, wherein the network subscriber metadata records are Internet data records.

11. A network subscriber usage recording system comprising:
    a plurality of collectors, each collector comprising:
        an encapsulator for reading a plurality of network subscriber metadata records from a network data source and converting the network subscriber metadata records to a plurality of data normalized metered events;
        an aggregator for processing the data normalized metered events to create aggregated normalized metered events;
        a storage system; and
        an auditor for generating audit normalized metered events from the data normalized metered events, wherein the auditor transfers the audit normalized metered events from a volatile memory to a persistent storage in the storage system periodically at a constant time interval; and
    an audit server in communication with the plurality of collectors, wherein the audit server retrieves audit normalized metered events from the auditor of each of the collectors.

12. The system of claim 11, wherein each collector further comprises a query manager, and the audit server is configured to query the corresponding collector via the query manager for retrieving and processing the audit normalized metered events.

13. The system of claim 11, wherein one of the audit normalized metered events is a number of the data normalized metered events in a data set dropped from processing by the aggregator.

14. The system of claim 11, wherein the audit server is configured to analyze the audit normalized metered events and generate an audit report.

15. The system of claim 11, further comprising a user interface in communication with a configuration server for configuring the audit server.

16. The system of claim 11, further comprising a user interface in communication with the audit server for configuration of the auditor in each collector.

17. The system of claim 11, further comprising a report server in communication with the audit server configured to generate audit reports based on the audit normalized metered events.

18. A collector within a plurality of collectors in a network subscriber usage recording system, said collector comprising:
    an encapsulator for reading a plurality of network subscriber metadata records from a network data source and converting the network subscriber metadata records to a plurality of data normalized metered events;
    an aggregator for processing the data normalized metered events to create aggregated normalized metered events;
    a storage system; and
    an auditor for collecting audit metadata from said collector and generating audit normalized metered events from the data normalized metered events, the auditor comprising a first audit point located at the encapsulator and a second audit point located at the aggregator, wherein the auditor transfers the audit normalized metered events from a volatile memory to a persistent storage in the storage system periodically at a constant time interval.

19. The collector of claim 18, wherein the auditor operates to generate input data set audit normalized metered events from data normalized metered events at the first audit point.

20. The collector of claim 18, wherein the auditor is configured to generate exception audit normalized metered events from data normalized metered events.

21. The collector of claim 18, wherein the auditor operates to generate input source audit normalized metered events from data normalized metered events at the first audit point.

22. The collector of claim 18, wherein one of the audit normalized metered events is a number of the data normalized metered events in a data set dropped from processing by the aggregator.

23. The collector of claim 18, wherein the auditor is configured to generate a collector audit normalized metered event from the data normalized metered events or audit normalized metered events.

24. The collector of claim 18, the auditor having an audit verification rule applied to the audit normalized metered events at the collector and generating alert outputs based on the audit verification rule.

25. A method for recording network subscriber usage comprising:
    providing a plurality of collectors, each collector including an encapsulator, an aggregator, a data storage system, and an auditor;
    operating the encapsulator of each collector to read a plurality of network subscriber metadata records from a network data source and convert the network subscriber metadata records to a plurality of data normalized metered events;
    aggregating at the aggregator of each collector the plurality of normalized metered events to create a plurality of aggregated normalized metered events; and
    storing the aggregated normalized metered events in the data storage system; and
    operating the auditor of each collector to collect audit metadata from the corresponding collector and provide audit normalized meter events pertaining to the aggregated normalized metered events, wherein the auditor transfers the audit normalized metered events from a volatile memory to a persistent storage in the storage system periodically at a constant time interval.

26. The method of claim 25, wherein the aggregator of each collector includes volatile memory for storing the aggregated normalized metered events periodically and temporarily.

27. The method of claim 25, wherein one of the audit normalized metered events is a number of the data normalized metered events in a data set dropped from processing by the aggregator of each collector.

28. The method of claim 25, further comprising providing a configuration server in communication with each of the collectors; and storing configuration data for each collector in the configuration server.

29. The method of claim 28, further comprising transferring the configuration data to the encapsulator, the aggregator and the data storage system of each collector at start-up.

30. The method of claim 25, further comprising providing a query manager in communication with the data storage system for managing queries of the data storage system.

31. The method of claim 25, further comprising providing an operational audit event and statistics log in communication with each collector; and collecting statistics associated with each collector in the operational audit event and statistics log.

32. The method of claim 25, further comprising parsing the network subscriber meta data records from a usage data source, read by the encapsulator of each collector.

* * * * *

UNITED STATES PATENT AND TRADEMARK OFFICE
CERTIFICATE OF CORRECTION

PATENT NO. : 8,463,617 B2
APPLICATION NO. : 10/453068
DATED : June 11, 2013
INVENTOR(S) : Alexander Charles Ranous et al.

Page 1 of 1

It is certified that error appears in the above-identified patent and that said Letters Patent is hereby corrected as shown below:

In the Claims:

In column 25, line 36, in Claim 7, delete "further wherein" and insert -- wherein --, therefor.

In column 27, line 17, in Claim 25, delete "meter" and insert -- metered --, therefor.

Signed and Sealed this
Third Day of September, 2013

Teresa Stanek Rea
*Acting Director of the United States Patent and Trademark Office*